United States Patent

Mizuno et al.

[11] Patent Number: 5,872,772
[45] Date of Patent: Feb. 16, 1999

[54] SOURCE POSITION DETECTING METHOD AND COMMUNICATIONS SYSTEM, COMMUNICATIONS EQUIPMENT AND RELAY SUITABLE FOR EXECUTING THE DETECTING METHOD

[75] Inventors: Kiyoshi Mizuno; Noriyuki Takao, both of Toyota, Japan

[73] Assignee: Toyota Kabushiki Kaisha, Toyota, Japan

[21] Appl. No.: 692,104

[22] Filed: Aug. 5, 1996

[30] Foreign Application Priority Data

Aug. 8, 1995 [JP] Japan ................................. 7-202590

[51] Int. Cl.[6] ................................................ H04L 12/56
[52] U.S. Cl. ........................................... 370/254; 370/401
[58] Field of Search ..................................... 370/400, 401, 370/402, 403, 248, 389, 392, 470, 471, 472, 466, 254, 252, 258, 431; 375/213, 211; 455/560, 456; 371/20.2

[56] References Cited

U.S. PATENT DOCUMENTS

| | | | |
|---|---|---|---|
| 4,896,315 | 1/1990 | Felker et al. | 370/252 |
| 5,003,533 | 3/1991 | Wantanabe | 370/258 |
| 5,105,424 | 4/1992 | Flang et al. | 395/200.73 |
| 5,198,805 | 3/1993 | Whiteside et al. | 370/248 |
| 5,367,519 | 11/1994 | Arai | 370/431 |
| 5,477,536 | 12/1995 | Picard | 370/400 |
| 5,550,807 | 8/1996 | Kuroshita | 370/252 |
| 5,570,466 | 10/1996 | Oechsle | 370/401 |

*Primary Examiner*—Chau Nguyen
*Assistant Examiner*—Kenneth Vanderpuye
*Attorney, Agent, or Firm*—Oliff & Berridge, PLC

[57] ABSTRACT

A source position detecting method and a communications system, communications equipment and relay suitable for implementing this method. When relaying a coded data signal from one individual network to another individual network, a first relay, for instance, increases the length of preambles by 1 and when relaying to the next individual network, a second relay, for instance, decreases the length of preambles by 2. Increment/decrement processing of the length of preambles can be carried out without decoding the main body of the coded data signal. Alternatively, preamble duration shortening accompanying the relay can be utilized and signal distortions accompanying signal transmission such as group delay and signal strength attenuation can also be utilized. Without processing the data at the relay, the destination equipment can obtain data concerning the position of the source equipment which transmitted the data signal, such as data concerning the transmission route of the data signal.

26 Claims, 24 Drawing Sheets

SOURCE POSITION DETECTING METHOD AND COMMUNICATIONS SYSTEM, COMMUNICATIONS EQUIPMENT AND RELAY SUITABLE FOR EXECUTING THE DETECTING METHOD

BACKGROUND OF THE INVENTION

1. Field of the Invention

The present invention relates to a communications system consisting of a plurality of communications equipment, for instance, a communications system for carrying out the communication of data between the communications equipment through a relay. In particular, the present invention relates to a method of detecting at the destination equipment the position of source equipment in a communications system. The present invention also relates to a communications system, communications equipment, and a relay suitable for implementing this method.

A "relay" referred to in the present application is the representative of a category including all devices involved in the inter-network transmission of data signals between communications equipment and which can perform relaying of data signals, addition of redundant signals to data signals, from one network to another network, and the like thus "relay" also includes such devices as repeaters. In addition, the "position" of source equipment referred to in the present invention is not restricted to the absolute or relative position coordinates of the source equipment and may include information which indicates, for example, to which node the source equipment is connected, where the node lies (in topological sense), what kind of topological relation lies between the node and a node to which the destination equipment is connected, how many relays are used to relay a frame from the source equipment to the destination equipment, how the relays function in frame process, or what the electrical or physical length the transmission line between the source and the destination equipment is. Further, the "detecting" and "specifying" of a position are also not restricted to the obtaining of information which explicitly indicates the position, but is a concept which includes the obtaining of information which implicitly indicates the position or the network segment to which the station belongs. Moreover "communications equipment" referred to in the present application is not restricted to a single unit of communications equipment. In other words, when interpreting the present invention, "communications equipment" should be taken as also including a complete communications system which generally includes a plurality of communications equipment. The "length" of preambles or postambles referred to in the present application means the length of preambles or postambles transmitted with data signals, while the "duration" of a head preamble means the number of bits included in the head preamble.

2. Description of the Prior Art

When transmitting a data signal from one communications equipment to another communications equipment, detecting the position of the source equipment at the destination equipment is often necessary. A procedure for fulfilling this requirement was disclosed in Japanese Patent Laid-Open Publication No. Sho 62-219843, in which, while using a relay capable of decoding, processing and coding a data signal to be relayed from a path to another path in a communications equipment, the following steps are performed.

In the first step, a source equipment transmits a data signal over a communications system (over a channel, to be exact). In the second step, at least one of a number of relays included in this communications system receives and decodes this data signal. In the third step, the relay appends an identification to the decoded data signal by processing the relevant data signal. In the fourth step, the relay encodes and transmits this data signal to which the identification has already been appended over the communications system. Steps 2–4 are executed by each relay the data signal passes through and thus in general a plurality of identifications are resultantly appended thereto. In the fifth step, destination equipment receives and decodes the data signal. In the sixth step, the destination equipment extracts the identifications from the decoded data signal and deciphers them to specify the relays.

For the ordinary skilled person in the art, it is obvious from the prior art publication that the above mentioned identification may be a count incremented or decremented at each relay, enabling the destination equipment to learn how many relays the received data signal has passed through. As apparently disclosed in the prior art publication, each of the above mentioned identifications may be a code unique to each relay, enabling the destination equipment to specify which relays the received data signal has passed through based on the contents or values of the identifications and, in addition, to learn how many relays the received data signal has passed through based on the number of the identification.

Although the above mentioned identification represents the number of relays involved in or relay history of the data signal transmission and is useful for the destination equipment to learn the position of the source equipment in order to append an identification according to the above mentioned procedure in each relay, a data signal must first be decoded, to enable appending the identification, and thereafter be coded, thereby introducing extended relay processing time and complicated configuration of the relaying apparatus due to, for example, the provision of a processing means for temporarily storing and thereafter processing data within a data signal.

SUMMARY OF THE INVENTION

One of the objects of the present invention is therefore to enable the detection of a source position at the destination equipment without carrying out the sequence of decoding a data signal to be relayed/extracting data from the decoded data signal, temporarily storing the data, and processing the data/coding the data to produce a relayed data signal. According to the present invention, this object is achieved by either the use of a preamble or a postamble which precedes or follows a data signal, or the use of normally unwelcome physical phenomena such as signal defections and signal distortions.

The present invention can be embodied as a relay-utilizing embodiment characterized by a relay which increments/decrements the number of redundant signals and a destination equipment which counts the number of redundant signals to detect the position of a source equipment which transmitted a data signal with the redundant signals. The redundant signals may be preambles, postambles, or the like and can be appended to the data signal after coding thereof by the source equipment. Initial value of the number of redundant signals, i.e., the number of redundant signals at the source equipment may preferably be a predetermined constant. One advantage of this embodiment is that it is not necessary to carry out processing such as decoding to the main body of a data signal when relaying it, since the increment/decrement to the number of redundant signals can be performed without processing the main body of a data signal such as appending an identification. In particular, attention should be drawn to the fact that a redundant signal is a signal appended to a data signal after coding. In other words, it is a signal which can be separated from the main body of the data signal without decoding. Therefore, according to the present embodiment, time required for relaying can be decreased and configuration of relay apparatus can be simplified. Another advantage of this embodiment is that a preamble and postamble previously known to a person skilled in the art can be used as the above mentioned redundant signal; in other words this embodiment can be implemented without newly adding a signal which has not hitherto been used. Although in the present application the function of preambles and postambles will be discussed only in connection with the present invention, a variety of preceding technological documents should be consulted for a detailed description of ordinary functions thereof. Moreover, the present invention is not limited to the use of preambles and postambles.

The present invention can be embodied as a source-utlilizing embodiment characterized by a source equipment which appends to a data signal to be transmitted a predetermined unique number of redundant signals and a destination equipment which counts the number of redundant signals appended to the received data signal to detect the position of the source equipment in the form of the count specifying the source equipment itself. Since redundant signals such as preambles and postambles appended to the relevant data signal after coding are utilized also in this embodiment, similar advantages as the relay-utilizing embodiment can be procured. Further, the present embodiment is superior to the relay-utilizing embodiment in its independecy from the connection scheme between communications equipments. The attention should be drawn to the fact that in the relay-utilizing embodiment the applicable connection scheme is limited to such a network structure or an internetwork connection utilizing a relay since the relay is indispensable to increment/decrement the number of redundant signals. In the present invention, since relays are not necessary to append to the data signal the information indicating the source position, the destination equipment can specify the source position regardless of the connection scheme, leading to wider application and to precise detection of the source position. In another aspect, the present embodiment is inferior to the relay-utilizing embodiment in its necessity of allocating, prior to the reduction to the practice, the unique number of redundant signals to be appended to respective communications equipment, leading narrower application in this respect.

A further embodiment of the present invention utilizes loss, in which a destination equipment extracts information relating to signal loss from a received data signal or redundant signals appended thereto at least before the received data signal is decoded and specifies the position of the source equipment based on the signal loss information it has extracted. Since this embodiment can implement by utilizing a data signal or redundant signals such as preambles or postambles and without utilizing relay, similar advantages to the source-utilizing embodiment can be procured. Moreover, since this embodiment can utilize a data signal and redundant signals are therefore dispensable, it has the advantage of wider application than the relay-utilizing and the source-utilizing embodiments in this respect. In other words, since there is no need to control redundant signals the present embodiment can be implemented relatively easily by the improvement of a part of receiving function of a prior communications equipment. However, in view of the fact that a means of accurately measuring the loss present in a data signal or a redundant signal is indispensable to this embodiment, the application is narrower than the relay-utilizing or the source-utilizing embodiments in another aspect.

The present invention can be expressed as a source detecting method and a communications system or a communications equipment or a relay suitable for implementing this method. This fact is obvious to a person skilled in the art from the disclosure in this application. In addition, the scope of the present invention includes various combinations of embodiments selected from among the three types of embodiment described above. Respective combination embodiments will of course have at least the advantages shared by basic embodiments.

One combination embodiment of the present invention is an embodiment combining a relay-utilizing embodiment and a source-utilizing embodiment, i.e., a relay/source joint-utilization embodiment, which would preferably be applied to an integrated network consisting of a plurality of individual networks selectively coupled via relays, in which for instance, the same procedure as the source-utilizing embodiment is utilized for transmissions within an individual network and the same procedure as the relay-utilizing embodiment is utilized for relay transmissions between individual networks. Consequent advantages can be obtained surpassing those gained by a simple combination, in other words the following 2 points: improved ease of implementation and extension of the range of application. This holds true for an embodiment combining a relay-utilizing embodiment, a source-utilizing embodiment, and a loss-utilizing embodiment, i.e., a relay/source/loss joint-utilization embodiment.

The first point encompass the improved ease of implementation is mainly based on the ease of allocation of the number of redundant signals which should be appended during transmission. If, for example, a source-utilizing embodiment is applied to an entire integrated network generally including an enormous amount of communications equipments, a number of redundant signals must be allocated to respective communications equipments such as will not coincide with that of other communications equipment, but such allocations are almost impossible in some cases. By contrast, when the relay/source joint-utilization embodiment is applied to the integrated network in such a manner that the source-utilizing-embodiment-like process performed only for the inside transmission of respective individual networks, as the amount of communications equipment constituting each of the individual networks is comparatively small, the above mentioned allocating is comparatively easy. In other words, the system design is easier in a relay/source joint-utilization embodiment wherein an identical number of redundant signals to be appended when transmission can be set to communication equipments belonging to different individual networks, without introducing any difficulties. This benefit is a consequence of the fact that the relay-utilizing-embodiment-like procedure is here used for relay transmission between networks, in other words specification is made possible in an individual network to which source equipment now belonging on the same principle as in the relay-utilizing embodiment.

The second point encompassing the extension of the range of application results from the fact that a new individual network can be joined to an integrated network without losing the capability to detect a source position. For example, it is difficult to join a new individual network to an integrated network where a relay-utilizing embodiment or a source-utilizing embodiment is implemented in its entirety, since a number-of-redundant-signals increment/decrement function must be newly provided to all relays to be connected to the relevant individual network and to all relays within the relevant new individual network and the number of redundant signals to be increased/decreased must be set individually and uniquely to such relays, or since the number of redundant signals to be appended at transmission must be individually and uniquely set for all communications equipment constituting the relevant new individual network. By contrast, it is easy to join a new individual network not using the source position detecting procedure of the present invention to an integrated network where a relay/source joint-utilization embodiment applying the relay-utilizing embodiment procedure to relay transmissions between networks, only by producing the number-of-redundant-signals increment/decrement function to an internetwork relay coupling the new individual network to the integrated network. In other words, even when a data signal has been transmitted from communications equipment belonging to the relevant new individual network to communications equipment which belongs to another individual network, destination equipment can learn that the data signal has been transmitted from one of the communications equipments belonging to the relevant new individual network since increment/decrement of the number of redundant signals is carried out by a relay to connect the relevant new individual network (irrespective of the data signal's point of transmission in the relevant new individual network).

Another combination embodiment of the present invention is an embodiment combining a relay-utilizing embodiment and a loss-utilizing embodiment, i.e., a relay/loss joint-utilization embodiment having an advantage of a precisely detected source position and improved reliability, an advantage which cannot be obtained from either of the basic two types of embodiment alone. In other words, since the position detection based on the number of redundant signals and the position detection based on signal loss information differ in that the former is essentially upper-level processing giving a topological position in the system configuration scheme whereas the latter is essentially lower-level processing giving a physical position, the synergistic improvement in precision as well as the reliability that if one should fail the other can still be used are offered. The same holds true on an embodiment combining a source-utilizing embodiment and a loss-utilizing embodiment, i.e., a source/loss joint-utilization embodiment, and the relay/source/loss joint-utilization embodiment described above.

A relay-utilizing embodiment has a number of variations concerning in particular the connection topology of the networks and the amount of increment and decrement of the number of redundant signals.

In a first variation, while employing a network connection topology in which 3 or more individual networks each having the respective communications equipment are cascade-connected in a serpentine form through a plurality of relays, each of the relays appends redundant signals to or removes redundant signals from the data signal so that when the data signal is transmitting in one serpentine direction the number of redundant signals will increase with a constant step at every relay and when the data signal is transmitting along another serpentine (i.e., inverse) direction the number of redundant signals will decrease with a constant step at every relay, the increasing and decreasing steps generally differing from each other. In this variation, since the difference between the number of redundant signals transmitted from a communications equipment in one individual network and the number of redundant signals received by another communications equipment in another individual network is equal to the product of the number of relays which exist between the two communications equipments, the amount of constant increment/decrement at each relay, and the number of redundant signals to be transmitted is predetermined, by detecting the number of received redundant signals at the destination equipment and then determining the difference between this number and the number of transmitted redundant signals, the destination equipment can learn how many relays there are between the source equipment and the destination equipment. On the other hand, since the number of redundant signals increases in one transmission direction and decreases in another transmission direction, by detecting at the destination equipment whether the number of received redundant signals has increased or decreased in comparison with the number of redundant signals transmitted from the source equipment, the destination equipment can learn from which direction a data signal has been transmitted on an integrated network. Therefore, in this variation, it is possible to specify the individual network to which source equipment belongs without altering the amount of increment/decrement to the number of redundant signals at each relay, implementation being especially simple.

In a second variation, while employing a network connection topology in which 3 or more individual networks each having the respective communications equipment are connected through a plurality of relays, each of the relays, in general, appends a mutually different number of redundant signals to or removes a mutually different number of redundant signals from the data signal so as to establish for every communications equipment the 1 to 1 basis correspondence between the number-of-redundant-signals received with the data signal and the set of relays involved in the transmission of the data signal. Therefore in this variation, the destination equipment can precisely specify the relays between the source equipment and the destination equipment as well as the individual network to which the source equipment belongs, simply by detecting and discriminating the number of redundant signals, even if the connection between the individual networks is a non-serpentine connection.

In a third variation, while employing the same network connection topology as in the second variation, each of the relays appends redundant signals to the data signal received from one direction and removes redundant signals from the data signal received from another direction, the number-of-redundant-signals to be appended or removed by each relay being different from other relays, so as to enable the destination equipment to specify the matters specified in the second variation as well as the data signal transmitting direction at respective relays involved in the transmission, even in a case in which a plurality of transmission lines exists in parallel between the source equipment and the destination equipment.

There are a number of variations of the relay-utilizing embodiment and the source-utilizing embodiment depending on the redundant signals used. A first variation uses either a preamble or a postamble. Although a second variation in which both a preamble and a postamble is used is more complex than the first variation, the system according to the second variation can easily be designated because of its capability of flexible setting on the number-of-redundant-signals to be appended or increased/decreased. In the second variation, there are also a number of sub-variations according to how the preamble and postamble are used. In a first sub-variation, source detection based on a preamble and source detection based on a postamble are carried out independently and the results are mutually checked. In a second sub-variation, a detected length of preambles and a detected length of postambles are added together (or alternatively one is subtract from the other) and source detection is carried out based on that result. A third sub-variation is a combination of the first sub-variation and the second sub-variation and in comparison to the first and second sub-variations is capable of still more flexible setting of the appending increment/decrement amount. A fourth sub-variation detects deficits in a preamble or postamble during transmission by checking the parity in the lengths of preambles and postambles and executes correction if possible.

The loss-utilizing embodiment has a number of variations depending on the type of phenomenon which is used to detect the loss accompanying a signal. In a first variation, the destination equipment detects the duration of a head preamble preceding the data signal, compares the duration with the initial value thereof, derives the number of lost bits at the head preamble from the duration change in the transmission line, and converts the number into information indicating the source position, such as the number of relays which cause the bit defection and exist between the destination equipment and the source equipment. In a second variation, the destination equipment detects signal distortion generated in and depending to the length of the transmission line connecting the source equipment to destination equipment and converts the detected signal distortion into the length of the transmission line, the length being a type of information indicating a source position. Since these variations utilize the hitherto unprofitable phenomena of preamble head loss and signal distortion, they are economical in view of the fact that it is not necessary to alter the transmission format. Moreover, signal distortion which can be utilized is, for example, a group delay distortion created by differences in transmission velocities of the plurality of frequency components which constitute a data signal and unlevelled signal attenuation created by differences in signal attenuation between the frequency components. A method utilizing group delay distortion is suitable for high frequency transmissions in which differences in group delay between frequency components is likely to be considerable. A method utilizing unlevelled signal attenuation is suitable for long distance transmissions in which signal attenuation is likely to be considerable.

DETAILED DESCRIPTION OF THE PREFERRED EMBODIMENTS

The preferred embodiments of the present invention will now be explained based on the diagrams.

a) Outline a1) Network Topology

FIGS. 1–5 topologically show example configurations of an integrated network suitable for implementing the present invention. In these diagrams, bus systems each forming a loop-type transmission line, i.e., one type of individual network capable of implementing the present invention are indicated by symbols A–D. Relays are indicated by symbols R, R1–R4. Symbols A1–A3, B1, C1, D1, D2, S1–S8 indicate communications equipment. With the exception of S1–S8, communications equipment belongs to the individual network having the same first letter as the symbol of the communications equipment.

Figure 1:
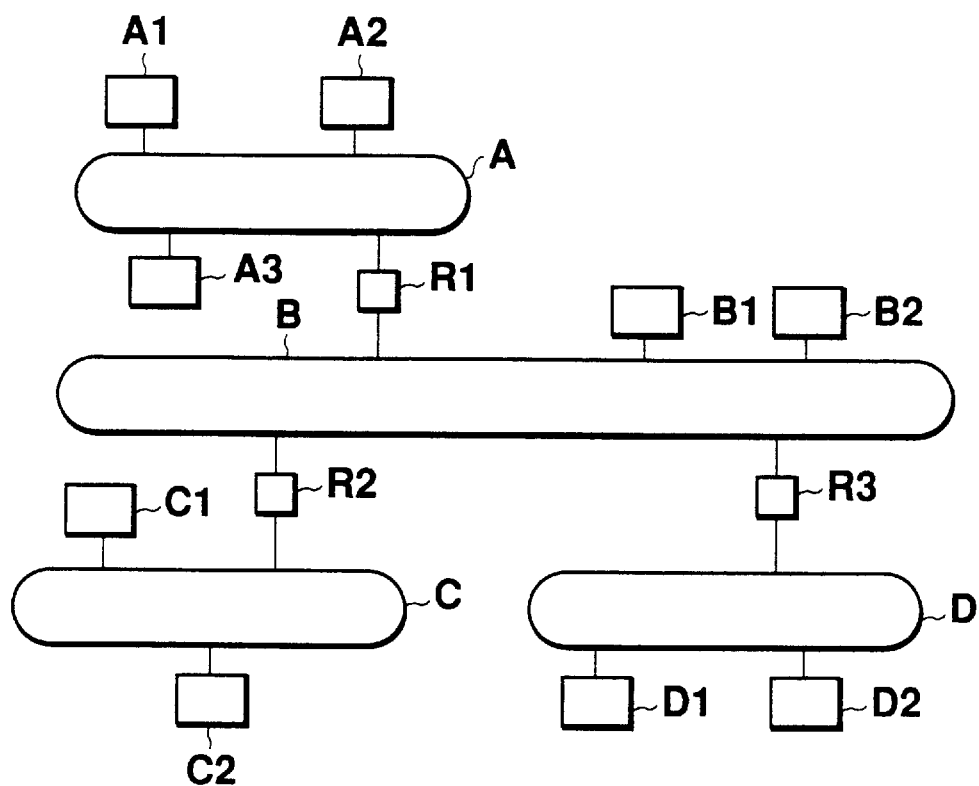
FIGS. 1, 2, 3 and 4 are topological sketches depicting example configurations of an integrated network suitable for implementing the present invention.
Figure 2:
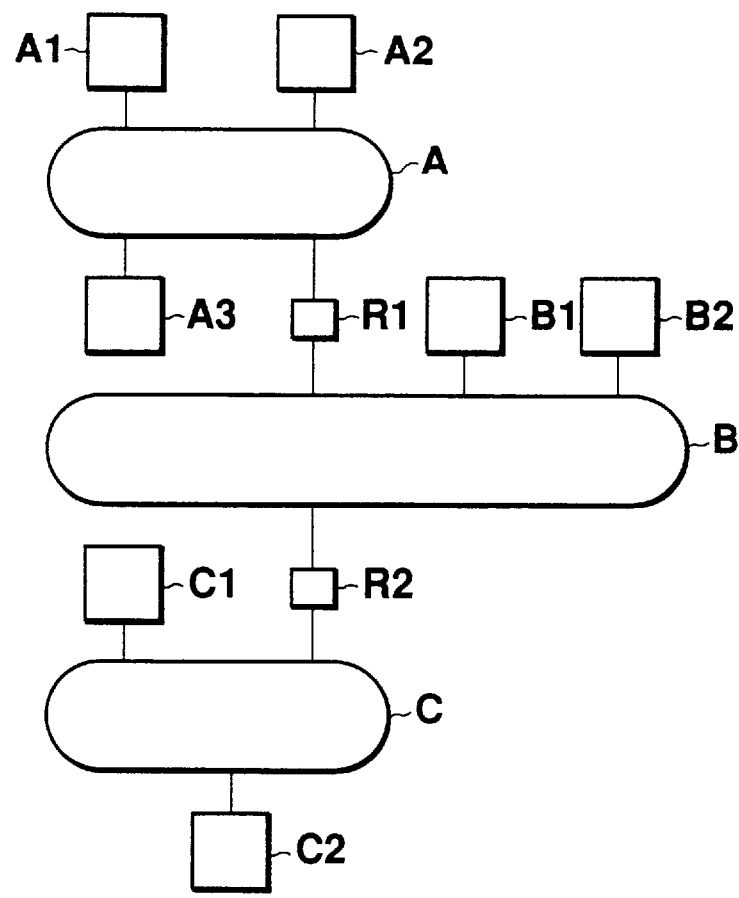
Figure 3:
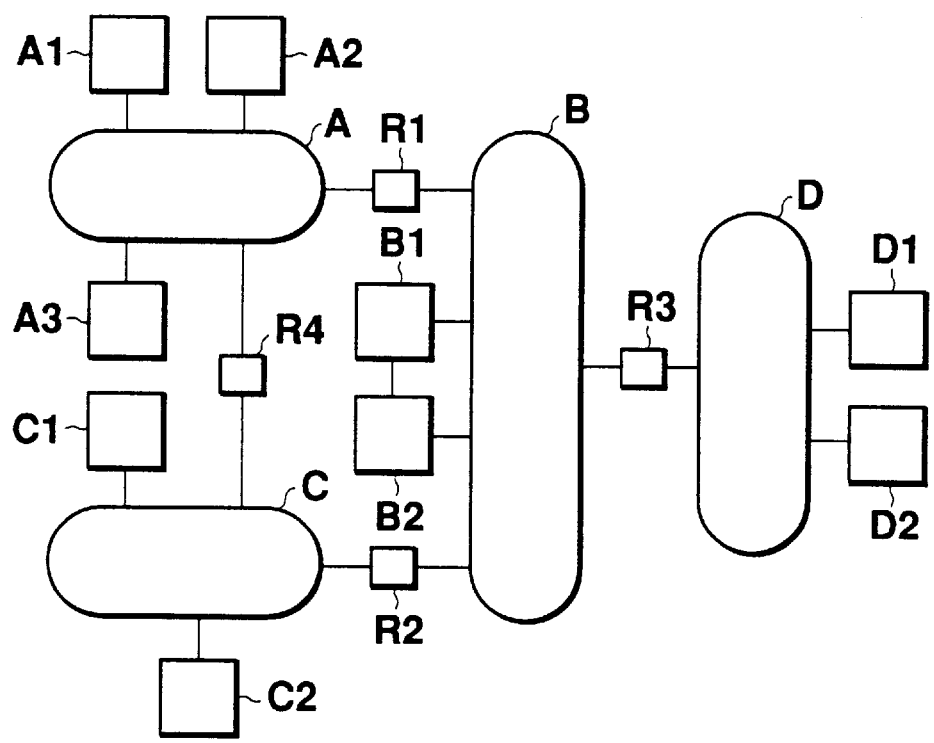

In FIGS. 1A and B are relayed connected by R1, B and C by R2, B and D by R3; in other words in FIG. 1, A, C and D form an indirectly internetwork connected network with B as an intermediary. Next, the integrated network shown in FIG. 2 is configured by removing D, D1, D2 and R3 from the integrated network in FIG. 1. In FIG. 2, a signal transmitted from A to C must pass via B; in the present application this relationship is referred to as a "serpentine cascade connection." The integrated network in FIG. 3 is configured by the addition of R4 to the integrated network shown in FIG. 1 in order to connect A and C; in other words, A–C are in loop-relay connection by R1, R2 and R4. Therefore in FIG. 3 when a signal is to be transmitted from A to B, for instance, the routes A→R1→B and A→R4→C→R2→B are available.

Figure 4:
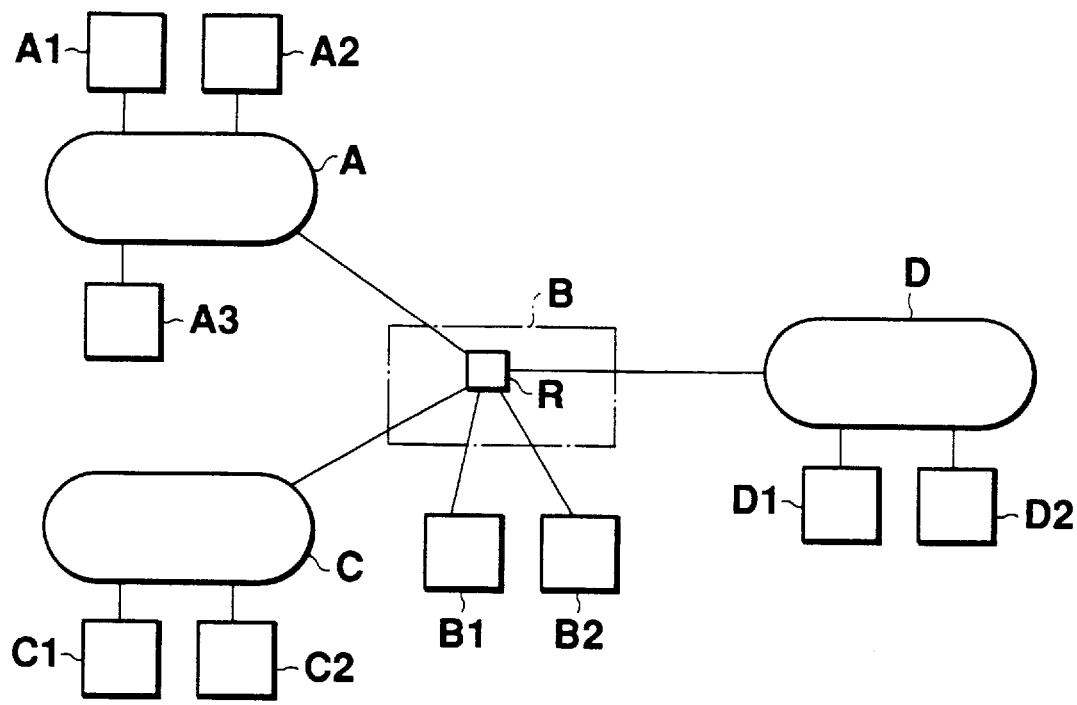
Figure 5:
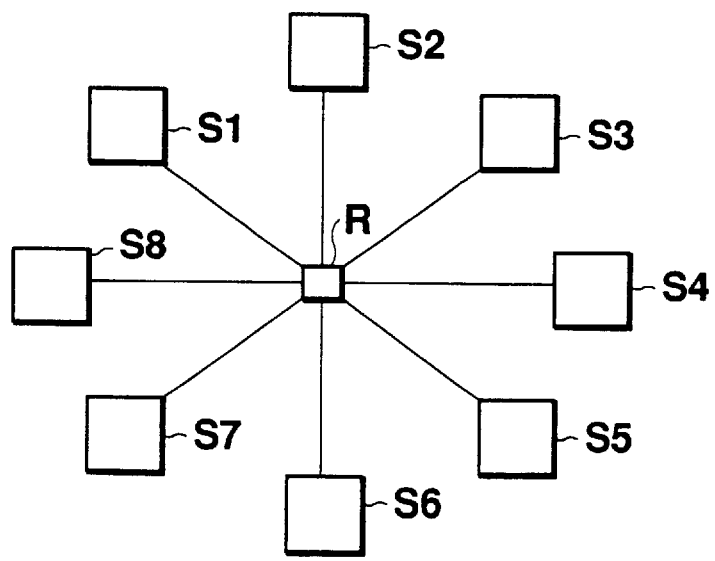
FIG. 5 is a topological sketch depicting an example configuration of a single network suitable for implementing the present invention.

The integrated network in FIG. 4 differs from the networks in FIGS. 1–3 in that a center relay is inserted into a connection between individual networks or between communications equipment; in other words, the integrated network in FIG. 4 is configured by modifying B in the integrated network shown in FIG. 1 into a constellation-type transmission line implementing a center relay connection at R between A, C, D, B1 and B2. The word "inter-network relay connection" described in the present application implies this type of center relay connection as well as a center relay connection at R between S1–S8 shown in FIG. 5. The word "individual network" described in the present application implies this constellation-type transmission line. Moreover the present invention is applicable not only to an integrated network but also to an individual network unit as included in FIG. 1 and as shown in FIG. 5.

a2) Frame Format

Figure 6:
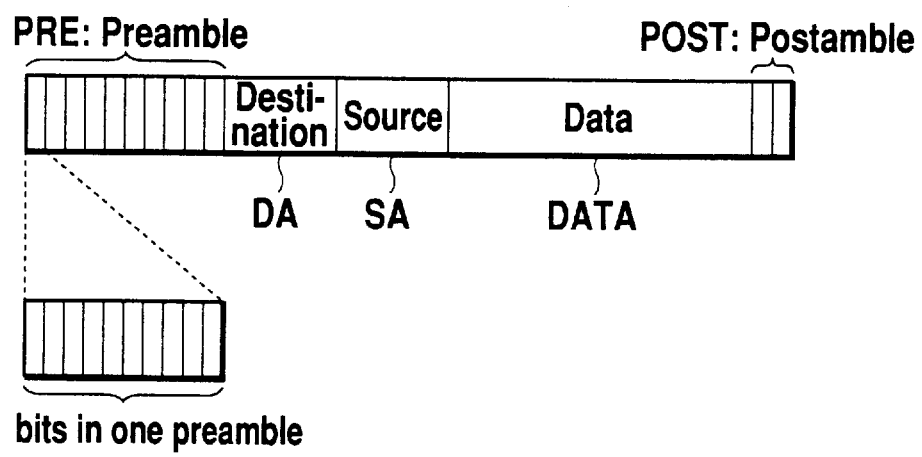
FIG. 6 is a conceptual diagram showing an example configuration of a frame.

FIG. 6 shows an example of a frame configuration suitable for implementing the present invention. In addition to the main body of data (DATA) to be transmitted, this frame includes source information (SA) (for instance a source address) for specifying the communications equipment which sent this DATA and destination information (DA) (for instance a destination address) for specifying the communications equipment which is to receive and decode this DATA. DATA, SA and DA are coded before transmission. The frame in FIG. 6 includes a preamble (PRE) and a postamble (POST) as signals to be added after coding. PRE and POST are generally respectively positioned at the head and the rear of a frame. For instance 10 PRE and 2 POST may be used. In addition, every PRE and POST is comprised of e.g., 10 bits. The communications equipment depicted in FIGS. 1–5 execute data communication using a frame with this configuration and each relay relays the relevant frame as appropriate.

For ordinary persons skilled in the art, frames including PRE and POST are well-known, the well-known art PRE enabling destination equipment to appropriately decode DATA addressed to it by capturing the clock timing and DATA position in the frame. Attention should be drawn to the fact that, in order for the destination equipment to decode DATA appropriately, it is necessary for the destination equipment to carry out decoding using a clock synchronized with the clock used by the source equipment to create the frame (i.e., clock synchronization) and the destination equipment must also detect the position of the DATA within the frame (i.e., frame synchronization). In a case in which a network or a transmission line is utilizing radio transmission, synchronization to the carrier frequency (i.e., frequency synchronization) and to the carrier phase (i.e., phase synchronization) are also necessary. PRE is a signal for establishing these synchronizations and, when used in communications, a predetermined length of PRE each with a designated duration should be appended to the head of a frame. Moreover, the well-known art POST has been used to clearly indicate the end of a frame.

In the present invention PRE and POST not only perform roles similar to well-known art, but also perform new and advantageous roles. For instance, in the relay-utilizing and source-utilizing embodiments described later and in the embodiments wherein either or both the relay-utilizing embodiment and source-utilizing embodiment is/are combined with a loss-utilizing embodiment, the "length" of either or both the PRE and POST is used for transmitting data showing the position of source equipment. In addition, in the loss-utilizing embodiment and in the embodiments wherein either or both the relay-utilizing embodiment and source-utilizing embodiment is/are combined with the loss-utilizing embodiment, using the fact that unwelcome physical phenomena accompanying signal transmission (e.g., signal distortion, group delay, signal attenuation, etc.) are likely to be generated in the PRE positioned at the head of a plurality of PRE at the beginning of a frame, information showing source position is transmitted. One common feature in respective embodiments of the present invention is that signals such as PRE and POST, in other words redundant (in the sense that they do not add any substantial content to the DATA) signals are utilized. Thus, in the present invention, by successfully utilizing the length or duration of PRE, POST, etc., information pertaining to the position of source equipment (for instance information pertaining to the route through which the received frame has been transmitted) is provided to the destination equipment to enable a frame default check by matching SA and DA in the received frame with the length or duration of PRE, POST, etc., without providing in DATA such areas to transmit the route information. It should later become clear that a loss-utilizing embodiment can also be implemented under a frame configuration with no redundant signals when the loss at the head of DATA is permissible.

a3) Relay

Transmitting the source position information utilizing redundant signals such as PRE and POST, which is one characteristic feature of the present invention, and unrelated to the contents of DATA, enables simplification of the relay configuration and shortening of the relaying time, as there is no need to write or process the source position information in the frame to be relayed.

Figure 7:
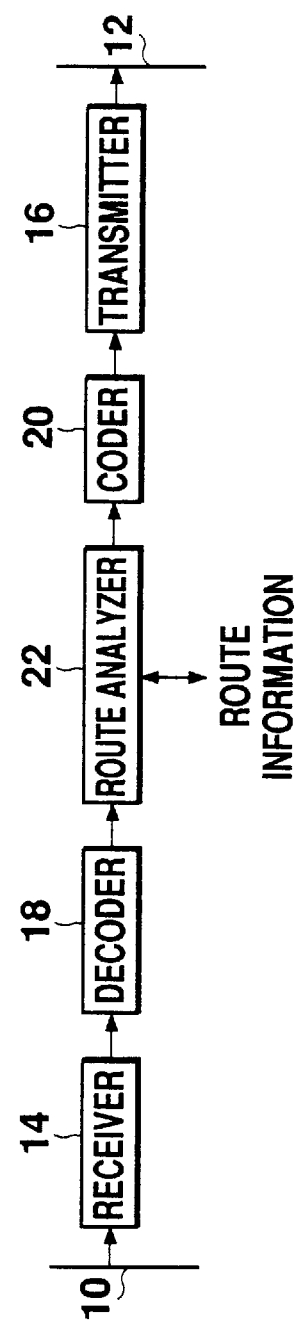
FIGS. 7, 8, 9 and 10 are block diagrams showing a configuration of a relay.

For instance, one of the functions of R1 in FIG. 1 might be to receive a signal from the A transmission line and transmit it to the B transmission line, in other words a relay function in the direction A→B. Conventionally, as FIG. 7 shows, to provide such a function, it is necessary to provide R1 having, in addition to a receiver 14 for receiving a signal from the A transmission line 10 and amplifying it to a level required for route analysis and a transmitter 16 amplifying a signal to a designated level and transmitting it to the B transmission line 12, a decoder 18 for converting a received frame to a processible format (such as digital data format), a coder 20 for inversely converting it to the frame format, and a route analyzer 22 for processing route information within temporarily decoded DATA obtained by the decoder 18. In other words, it was not possible to inform the destination equipment that a received frame had passed through R1 without decoding and processing DATA from the frame.

Figure 8:
Figure 9:
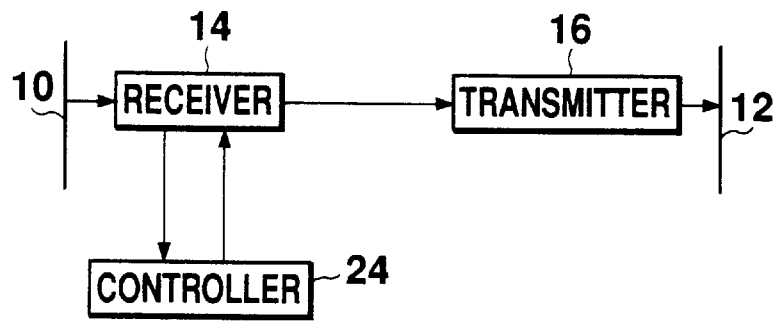
Figure 10:
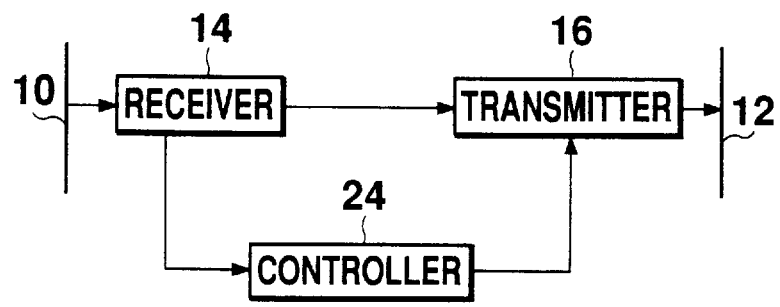

By contrast, in the present invention, information indicating the position of source equipment is transmitted using redundant signals such as PRE and POST so a decoder 18, coder 20 or route analyzer 22 are no longer necessary, as shown in FIGS. 8–10. The controller 24 shown in FIGS. 8–10 detects PRE and POST by monitoring signal waveforms (PRE and POST are generally designed to exhibit specific waveforms which can easily be detected). After the head PRE is detected and before the tail POST is detected, the controller 24 supplies the received signal to the transmitter 16 with appropriate amplification (in FIG. 8), or permits the received signal to be sent from the receiver 14 to the transmitter 16 (in FIG. 9), or permits the received signal to be transmitted by the transmitter 16 to the transmission line 12 (in FIG. 10). In a relay-utilizing embodiment (or in a combination of this embodiment with either or both of a source-utilizing embodiment and a loss-utilizing embodiment) the controller 24 also performs the function of executing increment/decrement to the length of either or both PRE and POST. Thus, according to the present invention, relay configuration is simplified compared to conventional relay configurations and processing time at the relay is shortened, thereby achieving low-cost, broad brand communication.

b) Relay-utilizing Embodiment b1) Principles

Figure 11:
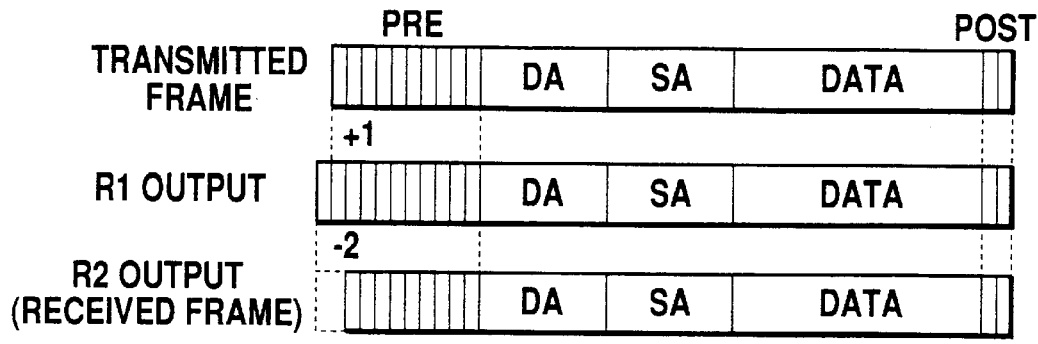
FIGS. 11, 12 and 13 are conceptual diagrams showing increment/decrement processing of a length of preambles, increment/decrement processing of a length of postambles and increment/decrement processing of a length of preambles and postambles, respectively, at a relay.
Figure 12:
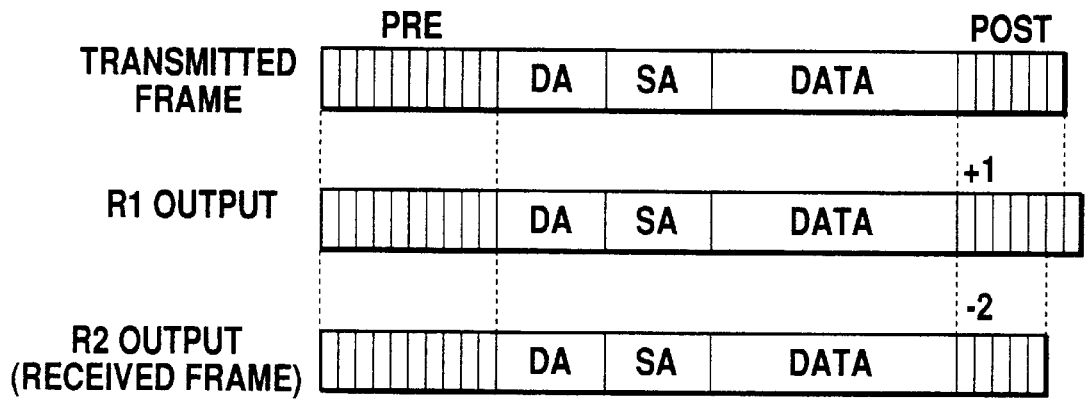
Figure 13:
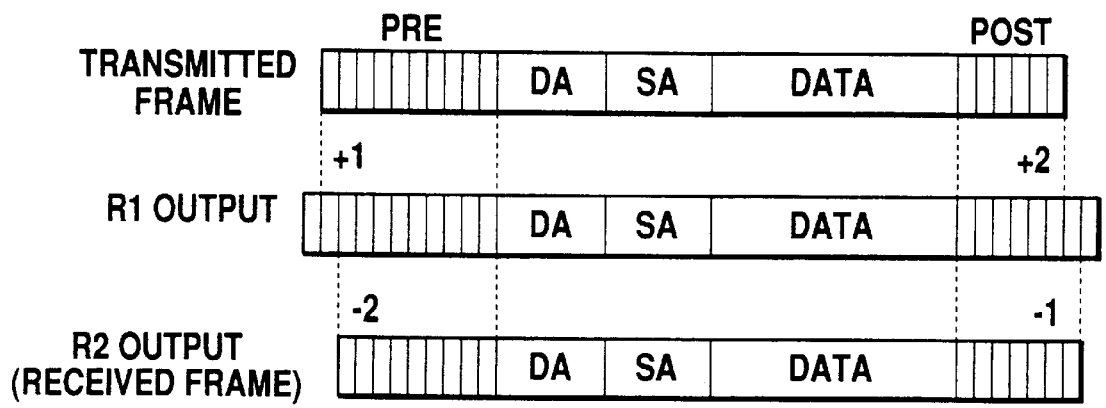

A relay-utilizing embodiment can be presented as one embodiment of the present invention, in which a relay executes increment/decrement to the length of PRE (see FIG. 11), the length of POST (see FIG. 12), or the length of both PRE and POST (see FIG. 13). FIGS. 11–13 are diagrams depicting examples of frame transmission using R1 and R2 (for instance frame transmission from A1 to C1 in FIG. 1), in which 10 PRE and 2 POST (FIG. 11) or 6 POST (FIGS. 12 and 13) are appended to the frame at the source equipment, at R1, the increase of the length of PRE is +1 (FIGS. 11 and 13) and that of POST is +1 (FIG. 12) or +2 (FIG. 13), at R2, the increase of the length of PRE is −2 (FIGS. 11 and 13) and that of POST is −2 (FIG. 12) or −1 (FIG. 13). Thus in the relay-utilizing embodiment, through the appropriate setting of the length of increments/decrements to PRE and/or POST at every relay, the destination equipment can determine, by detecting the length of PRE and/or POST within the received frame and referring the result to a predetermined logic, the position of the source equipment in the form of information representing a relay or relays by which the received frame have been relayed, information representing the individual network to which the source equipment belongs, for instance.

b2) Transmission

Figure 14:
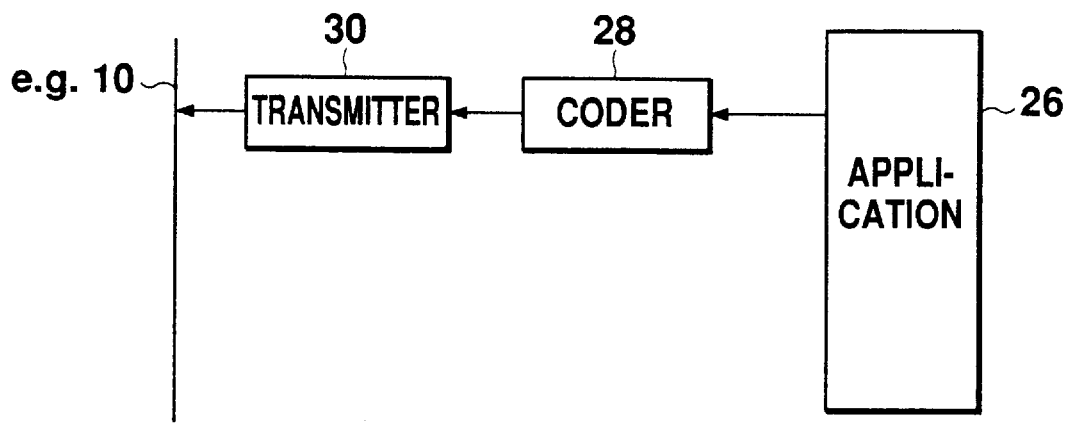
FIG. 14 is a block diagram depicting an example configuration of communications equipment suitable for implementing the present invention, in particular the portion pertaining to transmission.

FIG. 14 depicts an example configuration of communications equipment suitable for implementing the present embodiment, in particular the portion which pertains to transmission. An application 26 supplies data to be transmitted to a coder 28, the coder 28 codes and frames the data, and a transmitter 30 sends a frame thus obtained on the transmission line (e.g., 10) of the individual network to which it belongs (e.g., A). PRE and POST are appended to the frame by the transmitter 30 at this transmission, i.e., after coding.

b3) Reception

FIGS. 15–26 each depict example configurations of communications equipment suitable for implementing the present embodiment, in particular the portions which pertain to reception.

A receiver 32 receives a frame from a transmission line (e.g., 10) of the individual network to which it belongs (e.g., A), a decoder 34 deframes and decodes this frame and the application 26 receives the decoded data from the decoder 34. A preamble counter 36 counts the length of PRE at the head of the frame received by the receiver 32. A postamble counter 44 counts the length of POST at the end of the frame received by the receiver 32. An adder 46 and a subtractor 48 respectively determine the sum of or difference between the length of PRE counted and the length of POST counted.

A position calculator 38, a number-of-relays calculator 40 and a route calculator 42 create information relating to a source position using at least one of the PRE length, POST length, their sum or their difference and supply the resulting information to the application 26. The position calculator 38 specifies the individual network to which the source equipment belongs. The number-of-relays calculator 40 specifies the number of relays and the number of individual networks involved in the frame transmission. The route calculator 42 specifies a frame transmission route. A parity counter 50 executes a parity check of the count result of the length of PRE and POST. The position calculator 38 shown in FIGS. 21–26 is capable of replacement at the number-of-relays calculator 40 and/or the route calculator 42, but an explanation of the replaced configuration is omitted here for brevity.

b4) Setting Increment/Decrement Number

When the relay-utilizing embodiment is implemented, the method for setting the length of increment/decrement of the PRE and/or the POST at each relay is important, as the configuration choice shown in FIGS. 15–26 of the portions of the communications equipment pertaining to reception is to be used depends on these increment/decrement settings.

(EXAMPLE 1)

Figure 27:
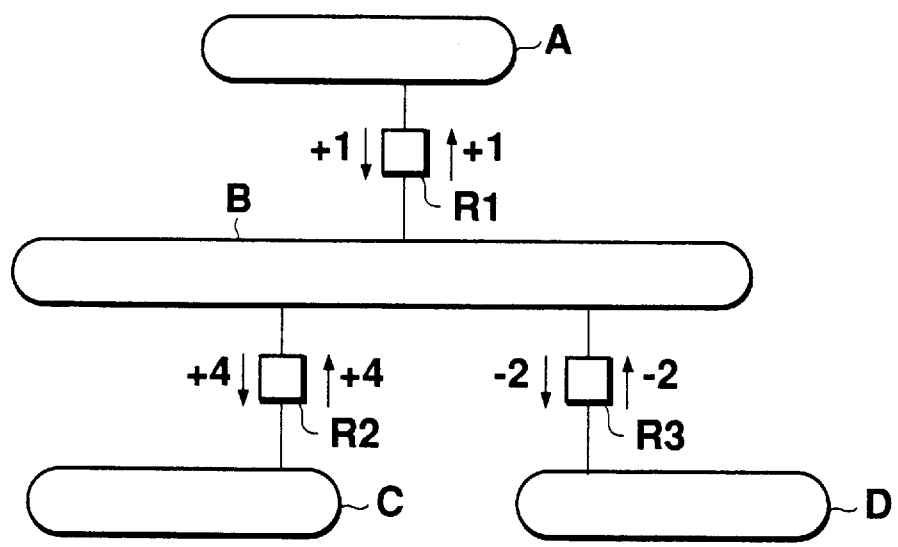
FIG. 27 is a diagram showing conceptually an example of increment/decrement of a length of preambles at a relay.

As a first example, increment/decrement is carried out only to PRE, the absolute values of lengths of increment/ decrement at respective relays differ from each other, and the signs of the lengths of PRE increment/decrement are not dependent on the relay direction (Table 1 and FIG. 27). In Table 1 it is assumed that the topology depicted in FIG. 1 and the length of PRE at transmission time=10. In such a case, an embodiment which provides a position calculator 38 shown in FIGS. 15 or 17 would be most preferable.

In other words, when the increment/decrement length setting shown in FIG. 1 is used, based on the individual network to which the destination equipment belongs and the length of PRE at reception time, the transmission route of a received frame and the individual network to which the source equipment belongs can be known as shown in Table 2. The position calculator 38, storing a table of correspondence between the length of PRE at reception time and the individual network to which the source equipment belongs, the route calculator 42, storing a table showing the correspondence between the length of PRE at reception time and the frame transmission route, determine the individual network to which source equipment belongs or a frame transmission route by comparing with its built-in table the PRE length obtained from the preamble counter 36. Please note that only a part of Table 2 is installed in the communications equipment, as the built-in table. For instance, if the individual network to which the equipment belongs is A, built-in tables would present the content of the top ¼ of Table 2.

For instance, in a case in which a frame is transmitted from A1 to D2 the frame transmission route is A→R1→B→R3→D and, since the PRE length is incremented by +1 at R1 and decremented by −2 at R3, the length of PRE has changed from 10 at A1 to 9 at D2. A preamble counter 36 within D2 detects 9 PRE and from this value of "9" the position calculator 38 and route calculator 42 within D2 judge the source equipment belongs=A and the route= A→B→D.

(EXAMPLE 2)

In a second example, increment/decrement is also carried out only to PRE, the absolute values of lengths of increment/ decrement at respective relays differ from each other and the signs of the lengths of PRE increment/decrement are not dependent on the relay direction (Table 3). It is also assumed here that at transmission time the length of PRE=10. However this example differs from the first example in that it is assumed that the topology is that shown in FIG. 2. As Table 4 shows since, in principle, specification of both an individual network to which source equipment belongs and a transmission

TABLE 1

| RELAY | R1 | | R2 | | R3 | |
|---|---|---|---|---|---|---|
| TRANSMIT-TING DIRECTION | A→B | B→A | B→C | C→B | B→D | D→B |
| PRE ADDITION | +1 | +1 | +4 | +4 | −2 | −2 |

TABLE 2

| INDIVIDUAL NETWORK INCLUDING DESTINATION | LENGTH OF PRE | ROUTE | INDIVIDUAL NETWORK INCLUDING SOURCE |
|---|---|---|---|
| A | 11 | B→A | B |
| | 15 | C→B→A | C |
| | 9 | D→B→A | D |
| B | 11 | A→B | A |
| | 14 | C→B | C |
| | 8 | D→B | D |
| C | 15 | A→B→C | A |
| | 14 | B→C | B |
| | 12 | D→B→C | D |
| D | 9 | A→B→D | A |
| | 8 | B→D | B |
| | 12 | C→B→D | C |

(INITIAL VALUE OF LENGTH OF PRE = 10)

TABLE 3

| RELAY | R1 | | R2 | |
|---|---|---|---|---|
| TRANSMIT-TING DIRECTION | A→B | B→A | B→C | C→B |
| PRE ADDITION | +1 | +1 | −2 | −2 |

TABLE 4

| INDIVIDUAL NETWORK INCLUDING DESTINATION | LENGTH OF PRE | ROUTE | INDIVIDUAL NETWORK INCLUDING SOURCE |
|---|---|---|---|
| A | 11 | B→A | B |
| | 9 | C→B→A | C |
| B | 11 | A→B | A |
| | 8 | C→B | C |
| C | 9 | A→B→C | A |
| | 8 | B→C | B |

Figure 15:
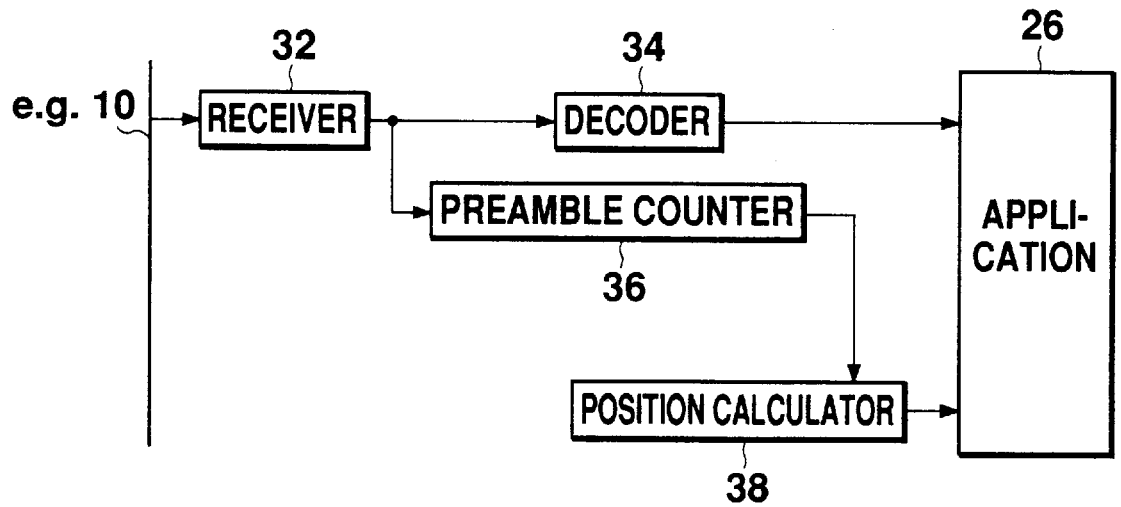
FIGS. 15, 16, 17, 18, 19, 20, 21, 22, 23, 24, 25 and 26 are diagrams depicting example configurations of communications equipment suitable for implementing the present invention, in particular the portion pertaining to reception.
Figure 17:
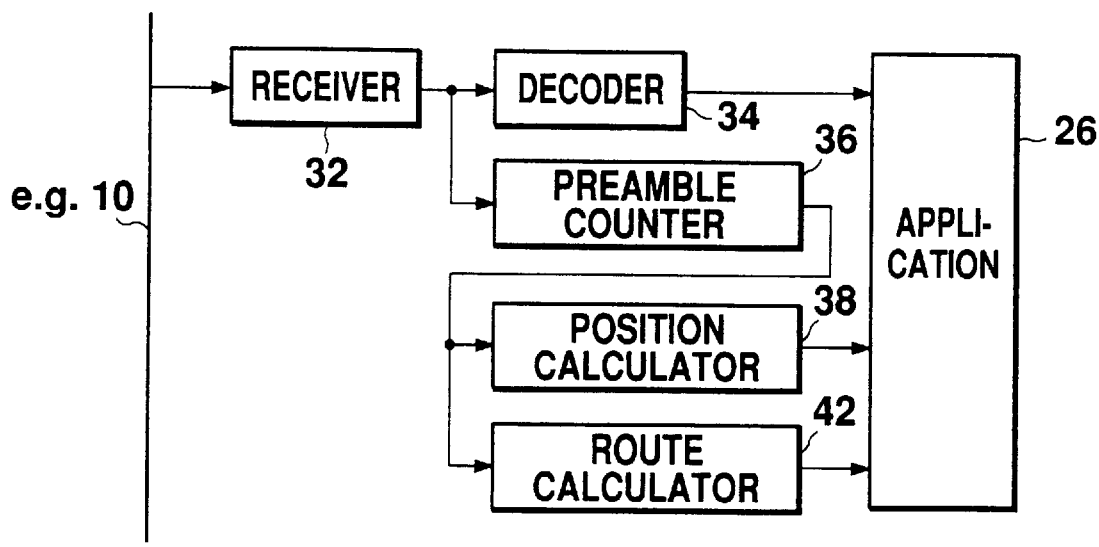
Figure 18:
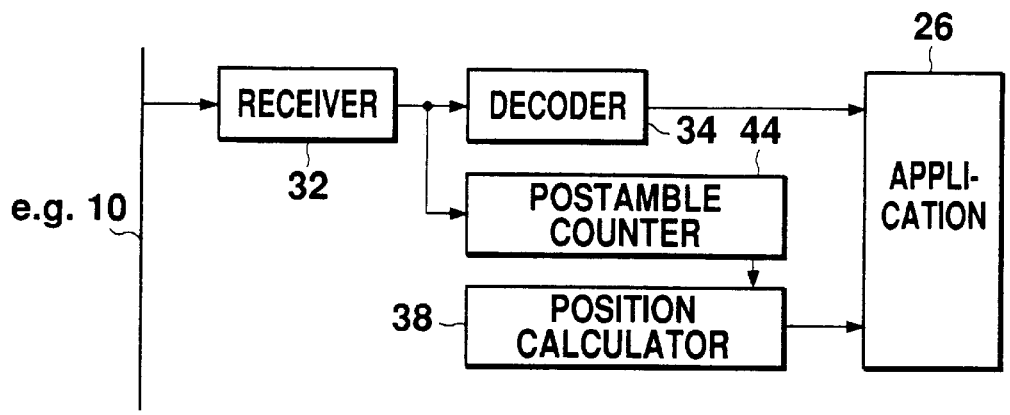
Figure 19:
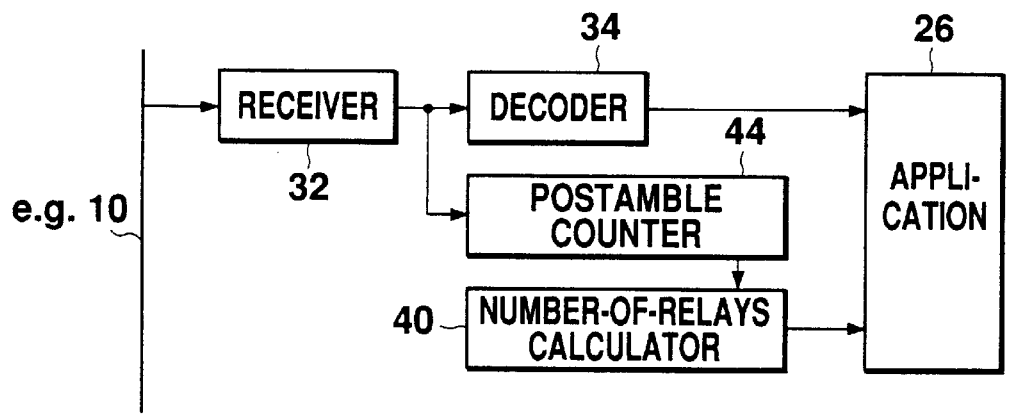
Figure 20:
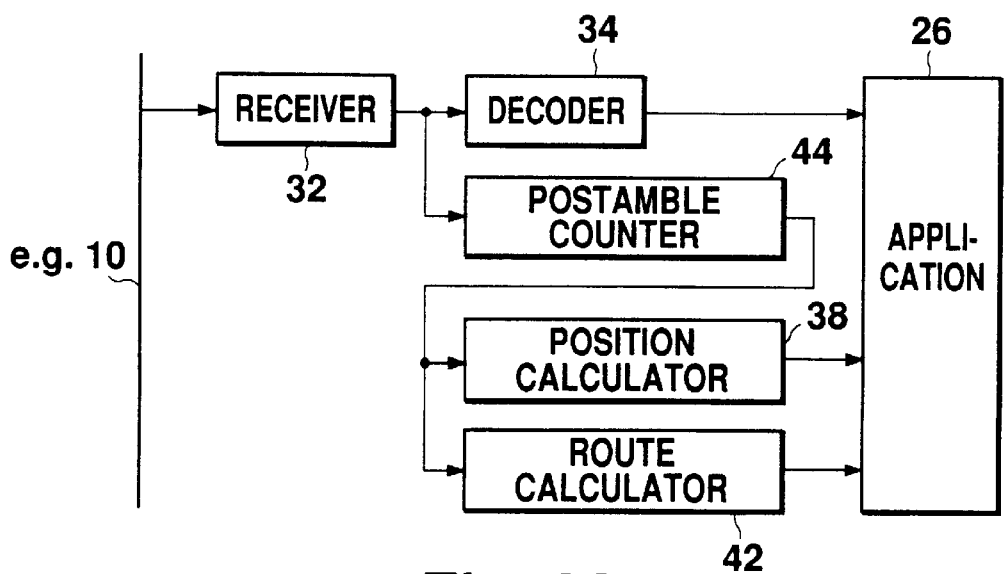

(INITIAL LENGTH OF PRE = 10)

route are both possible in this example, the preferred embodiments are those shown in FIG. 15 or FIG. 17.

(EXAMPLE 3)

Figure 16:
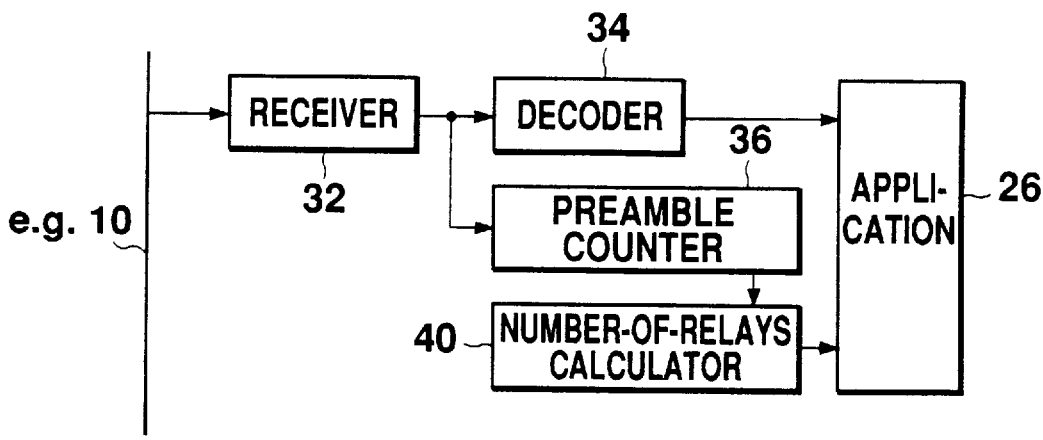

In a third example, it is envisaged that increment/decrement is carried out only to PRE, the absolute values of lengths of increment/decrement at all the relays are equal and the signs of the lengths of PRE increment/decrement are not dependent on the relay direction (Table 5). In Table 5 it is assumed that the topology is that shown in FIG. 1 and that at transmission time PRE=10. In such a case, the embodiments shown in FIG. 15 or FIG. 17, in which a source calculator 38 is provided, are acceptable, but a more simplified embodiment such as is shown in FIG. 16 (in other words an embodiment having a number-of-relays calculator 40) is most preferable. The number-of-relays calculator 40 determines the number of existing relays by subtracting the initial length of PRE at transmission time from the length of PRE counted and sends this number-of-relays result to the application 26.

With the settings shown in Table 5, for instance when communications equipment belonging to A receives a frame with 12 PRE, the communications equipment cannot discriminate whether the source equipment belongs to individual network C or D, as shown in Table 6. It is nevertheless usually possible to learn the number of relays which exist between the individual network to which the source equipment belongs and the individual network to which the destination equipment belongs. Therefore if the purpose is only to learn the number of relays between the source and destination, the operation shown in these Tables is sufficient.

TABLE 5

| RELAY | R1 | | R2 | | R3 | |
|---|---|---|---|---|---|---|
| TRANSMIT-TING DIRECTION | A→B | B→A | B→C | C→B | B→D | D→B |
| PRE ADDITION | +1 | +1 | +1 | +1 | +1 | +1 |

TABLE 6

| INDIVIDUAL NETWORK INCLUDING DESTINATION | LENGTH OF PRE | ROUTE | INDIVIDUAL NETWORK INCLUDING SOURCE |
|---|---|---|---|
| A | 11 | B→A | B |
|   | 12 | C→B→A | C |
|   | 12 | D→B→A | D |
| B | 11 | A→B | A |
|   | 11 | C→B | C |
|   | 11 | D→B | D |
| C | 12 | A→B→C | A |
|   | 11 | B→C | B |
|   | 12 | D→B→C | D |
| D | 12 | A→B→D | A |
|   | 11 | B→D | B |
|   | 12 | C→B→D | C |

(INITIAL VALUE OF LENGTH OF PRE = 10)

TABLE 7

| RELAY | R1 | | R2 | |
|---|---|---|---|---|
| TRANSMITTING DIRECTION | A→B | B→A | B→C | C→B |
| PRE ADDITION | +1 | +1 | +1 | +1 |

TABLE 8

| INDIVIDUAL NETWORK INCLUDING DESTINATION | LENGTH OF PRE | ROUTE | INDIVIDUAL NETWORK INCLUDING SOURCE |
|---|---|---|---|
| A | 11 | B→A | B |
|   | 12 | C→B→A | C |
| B | 11 | A→B | A |
|   | 11 | C→B | C |
| C | 12 | A→B→C | A |
|   | 11 | B→C | B |

(INITIAL LENGTH OF PRE = 10)

(EXAMPLE 4)

In a fourth example as well, increment/decrement is carried out only to PRE, the absolute values of numbers of increment/decrement at all the relays are equal, and the signs of the lengths of PRE increment/decrement are not dependent on the relay direction (Table 7). Moreover, it is assumed that at transmission time PRE=10. However, in Table 7 it is assumed that the topology is that shown in FIG. 2. With the settings shown in Table 7, for instance when communications equipment belonging to B receives a frame with 11 PRE, the communications equipment cannot discriminate whether the source equipment belongs to individual network A or C, as shown in Table 8. It is nevertheless usually possible to learn the number of relays which exist between the individual network to which the source equipment belongs and the individual network to which the destination equipment belongs. In this case as well, the preferred embodiment is that shown in FIG. 16.

(EXAMPLE 5)

In a fifth example, increment/decrement is carried out only to PRE, the absolute values of lengths of increment/decrement at all the relays are equal, and the PRE increment/decrement lengths vary depending on the relay direction (Table 9). Moreover, it is assumed that the topology is that shown in FIG. 2 and that at transmission time PRE=10. This example is characterized in that the PRE increment/decrement length is dependent on relay direction. As Table 10 shows, in this example the individual network to which source equipment belongs

TABLE 9

| RELAY | R1 | | R2 | |
|---|---|---|---|---|
| TRANSMITTING DIRECTION | A→B | B→A | B→C | C→B |
| PRE ADDITION | +1 | −2 | +1 | −2 |

TABLE 10

| INDIVIDUAL NETWORK INCLUDING DESTINATION | LENGTH OF PRE | ROUTE | INDIVIDUAL NETWORK INCLUDING SOURCE |
|---|---|---|---|
| A | 8 | B→A | B |
|   | 6 | C→B→A | C |
| B | 11 | A→B | A |
|   | 8 | C→B | C |
| C | 12 | A→B→C | A |
|   | 11 | B→C | B |

(INITIAL LENGTH OF PRE = 10)

TABLE 11

| RELAY | R1 | | R2 | | R3 | |
|---|---|---|---|---|---|---|
| TRANSMITTING DIRECTION | A→B | B→A | B→C | C→B | B→D | D→B |
| PRE ADDITION | +1 | −2 | +1 | −2 | +1 | −2 |

TABLE 12

| INDIVIDUAL NETWORK INCLUDING DESTINATION | LENGTH OF PRE | ROUTE | INDIVIDUAL NETWORK INCLUDING SOURCE |
|---|---|---|---|
| A | 8 | B→A | B |
| | 6 | C→B→A | C |
| | 6 | D→B→A | D |
| B | 11 | A→B | A |
| | 8 | C→B | C |
| | 8 | D→B | D |
| C | 12 | A→B→C | A |
| | 11 | B→C | B |
| | 9 | D→B→C | D |
| D | 12 | A→B→D | A |
| | 11 | B→D | B |
| | 9 | C→B→D | C |

(INITIAL VALUE OF LENGTH OF PRE = 10)

and the frame transmission route can be specified from the length of PRE at reception time and it is thus preferable to use the embodiments shown in FIG. 15 or FIG. 17.

(EXAMPLE 6)

In a sixth example, increment/decrement is carried out only to PRE, the absolute values of lengths of increment/decrement at all the relays are equal, and the PRE increment/decrement lengths vary depending on the relay direction (Table 11). In addition, it is assumed that at transmission time PRE=10. However, in this example it is assumed that the topology is that shown in FIG. 1. As Table 12 shows, in this example it is not always possible to specify the individual network to which source equipment belongs. In other words, a setting wherein the PRE increment/decrement lengths are direction-dependent yet equal at every relay is appropriate to the serpentine cascade connection shown in FIG. 2.

(EXAMPLE 7)

In a seventh example, increment/decrement is carried out only to PRE, PRE increment/decrement lengths are generally not equal at every relay, and the PRE increment/decrement lengths vary depending on the relay direction (Table 13). In this example it is assumed that the topology is that shown in FIG. 3 and that at transmission time PRE=10. This setting, in other words a setting wherein the PRE increment/decrement lengths are different at every relay, and are dependent on direction, is appropriate for a case in which a plurality of frame transmission routes or a plurality of involving relay combinations may exist in a topology, such as that shown in FIG. 3.

TABLE 13

| RELAY | R1 | | R2 | | R3 | | R4 | |
|---|---|---|---|---|---|---|---|---|
| TRANSMITTING DIRECTION | A→B | B→A | B→C | C→B | B→D | D→B | A→C | C→A |
| PRE ADDITION | +1 | −4 | +4 | −1 | −2 | +3 | −2 | +3 |

TABLE 14

| INDIVIDUAL NETWORK INCLUDING DESTINATION | LENGTH OF PRE | ROUTE | INDIVIDUAL NETWORK INCLUDING SOURCE |
|---|---|---|---|
| A | 6 | B→A | B |
| | 17 | B→C→A | B |
| | 13 | C→A | C |
| | 5 | C→B→A | C |
| | 9 | D→B→A | D |
| | 20 | D→B→C→A | D |
| B | 11 | A→B | A |
| | 7 | A→C→B | A |
| | 9 | C→B | C |
| | 14 | C→A→B | C |
| | 13 | D→B | D |
| C | 8 | A→C | A |
| | 15 | A→B→C | A |
| | 14 | B→C | B |
| | 4 | B→A→C | B |
| | 17 | D→B→C | D |
| | 7 | D→B→A→C | D |
| D | 9 | A→B→D | A |
| | 5 | A→C→B→D | A |
| | 8 | B→D | B |
| | 7 | C→B→D | C |
| | 12 | C→A→B→D | C |

(INITIAL VALUE OF LENGTH OF PRE = 10)

Moreover, as Table 14 shows, since in principle specification of an individual network to which source equipment belongs and specification of a transmission route are both possible in this example, the preferred embodiments are those shown in FIG. 15 or FIG. 17.

In this example imparting of direction-dependence to the PRE increment/decrement lengths by R1–R4 is introduced, i.e., if the PRE increment/decrement length at one relay is positive for one direction then it is negative for the other direction. This is in order to prevent the PRE length at reception from becoming significantly different from the PRE length at transmission. In other words, to prevent a heavy load on the preamble counter 36 due to extremely long PRE while simultaneously preventing failing to synthesize the destination equipment with the source equipment due to the extremely small length of PRE.

(EXAMPLE 8)

In Examples 1–7 increment/decrement was carried out to PRE but there are in fact examples in which increment/decrement is carried out to POST. An example can be envisaged wherein, in the explanations pertaining to Examples 1–7, PRE is replaced with POST, preamble counter 36 with postamble counter 44, FIG. 15 with FIG. 18, FIG. 16 with FIG. 19 and FIG. 17 with FIG. 20. Explanation of such an example is omitted here for brevity.

(EXAMPLE 9)

Figure 28:
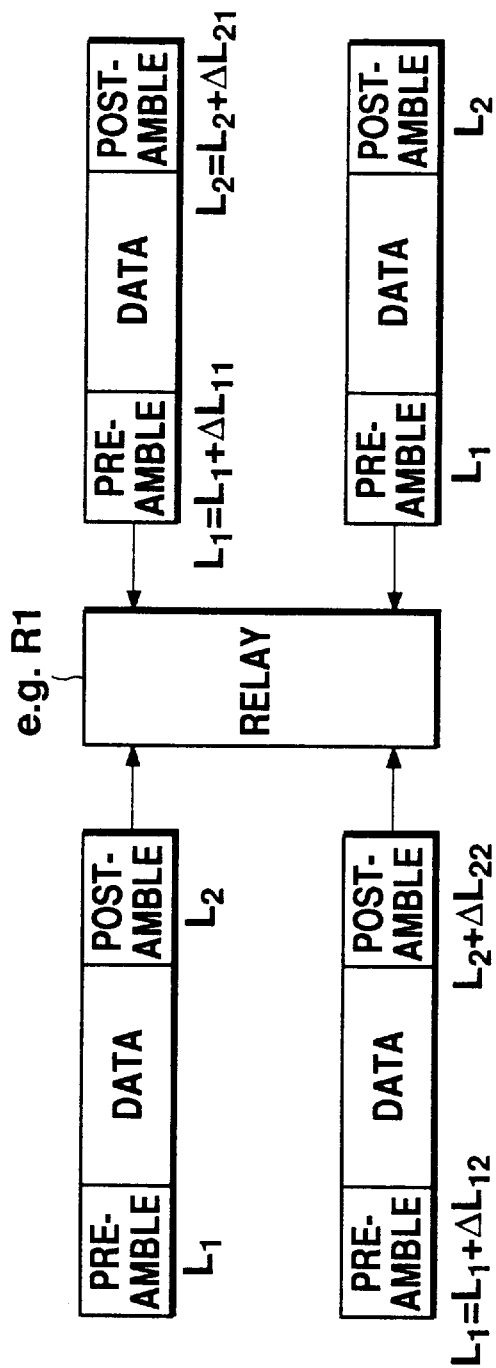
FIG. 28 is a diagram showing conceptually an example of increment/decrement of a length of preambles and postambles at a relay.

In a ninth example, increment/decrement is carried out to both PRE and POST as shown in FIG. 28 and Table 15. The symbols "→" and "←" in Table 15 correspond to the transmission directions shown in FIG. 28. The same reasoning naturally holds in this example as in examples 1–8 described above. In addition, since in the present example both PRE and POST are used, that is: a comparatively wide range is available to increase/decrease length of redundant signals for transmission of information concerning the position of source equipment, the present example can easily be applied to an integrated network with a comparatively complex topology or with a comparatively large number of individual networks or relays.

TABLE 15

| TRANSMISSION DIRECTION | → | ← |
|---|---|---|
| PRE ADDITION | $\Delta L_{11}$ | $\Delta L_{12}$ |
| POST ADDITION | $\Delta L_{21}$ | $\Delta L_{22}$ |

In the present example, since 2 possible information concerning source equipment position (one based on PRE and one based on POST) are obtained, more valuable information can be obtained by combining these two.

Figure 21:
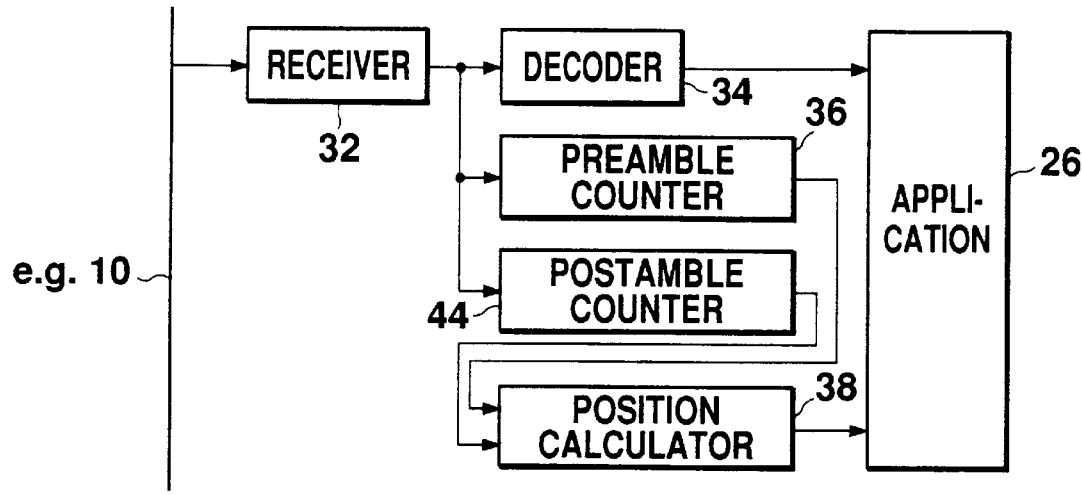

For instance, in FIG. 21 a position calculator 38 determines a total of two possible individual networks to which the source equipment belongs, one based on PRE count, another one based on POST count. In a case in which these two results match, for instance, the position calculator 38 sends them to the application 26 with the notice for reporting the normality; in a case in which they do not match the position calculator 38 notifies the application 26 of the two possibilities and also of the fact that they do not match. Thus it is possible to detect the level of reliability of the detection of the individual network to which the source equipment belongs, with the one or two possible results.

Figure 22:
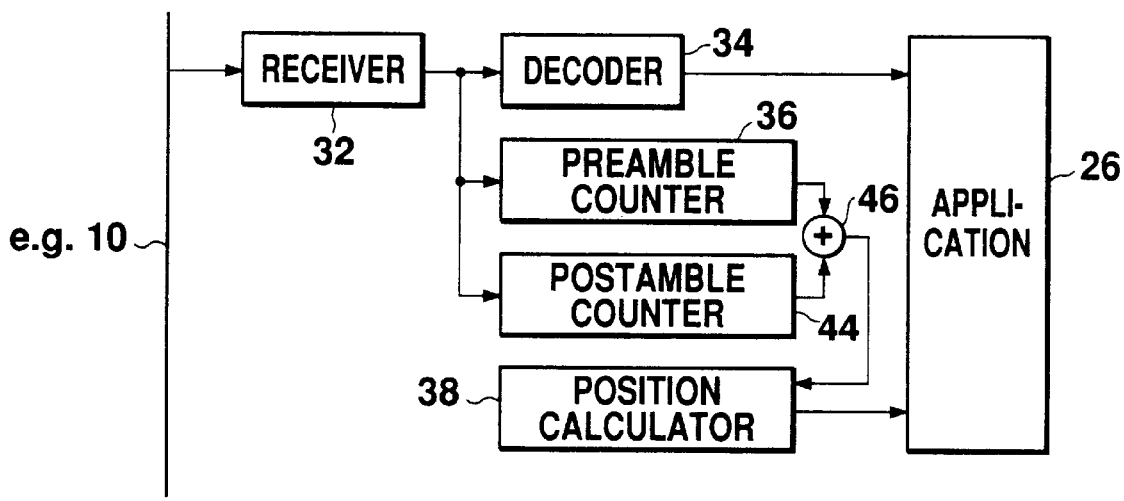
Figure 23:
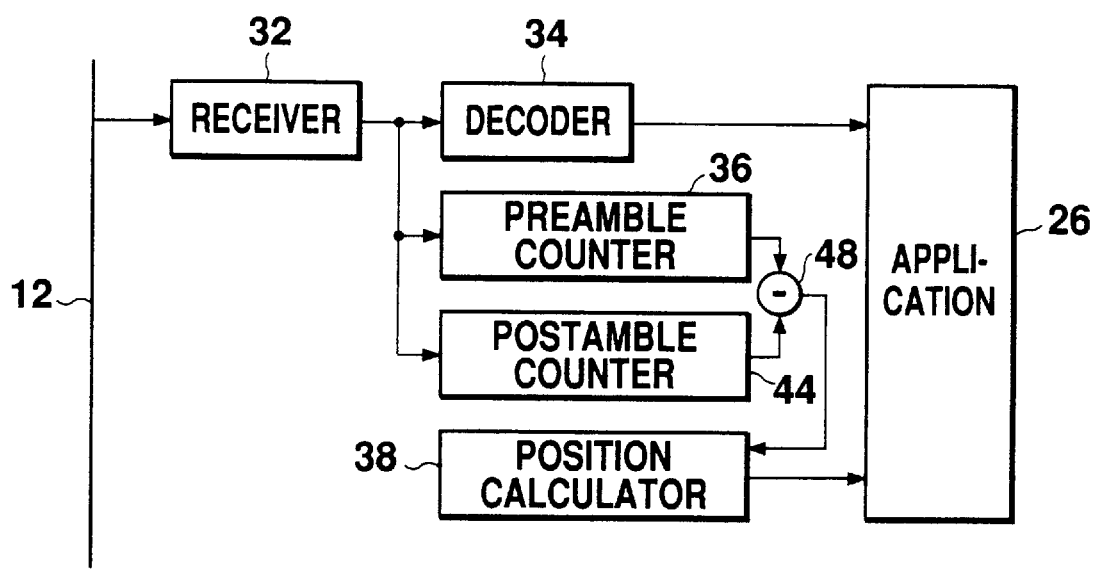

For instance, in FIG. 22 the position calculator 38 determines the individual network to which the source equipment belongs based on the total length of PRE and POST. In order for determination to be possible, $\Delta L11+\Delta L21=\Delta L12+\Delta L22$ must hold at every relay. Moreover, for instance in FIG. 23, the position calculator 38 determines the individual network to which the source equipment belongs based on the difference between length of PRE and the length of POST. In order for determining to be possible, $\Delta L11-\Delta L21=\Delta L12-\Delta L22$ must hold at every relay.

Figure 24:
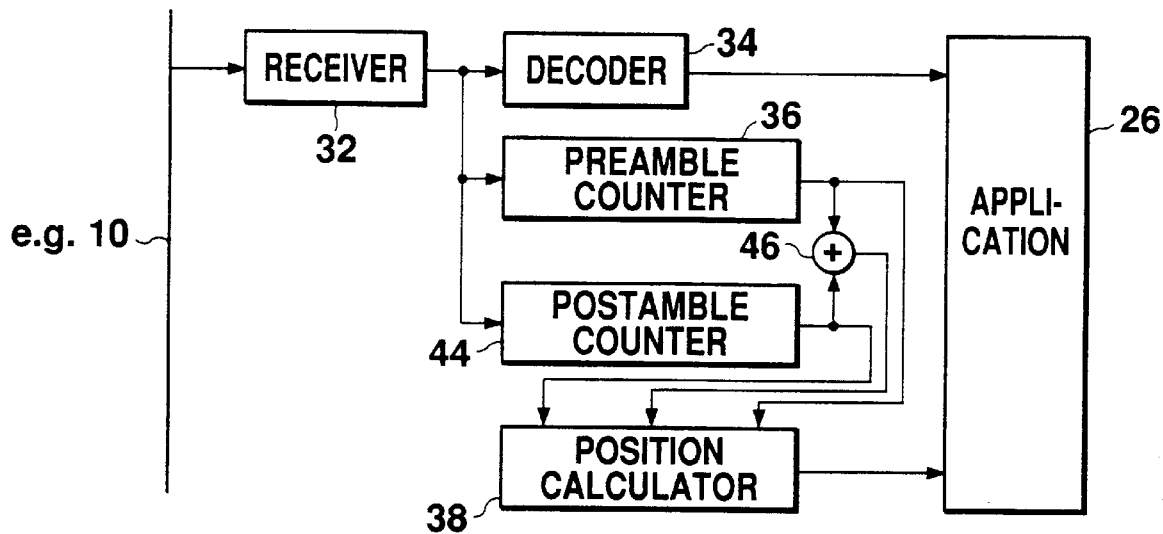
Figure 25:
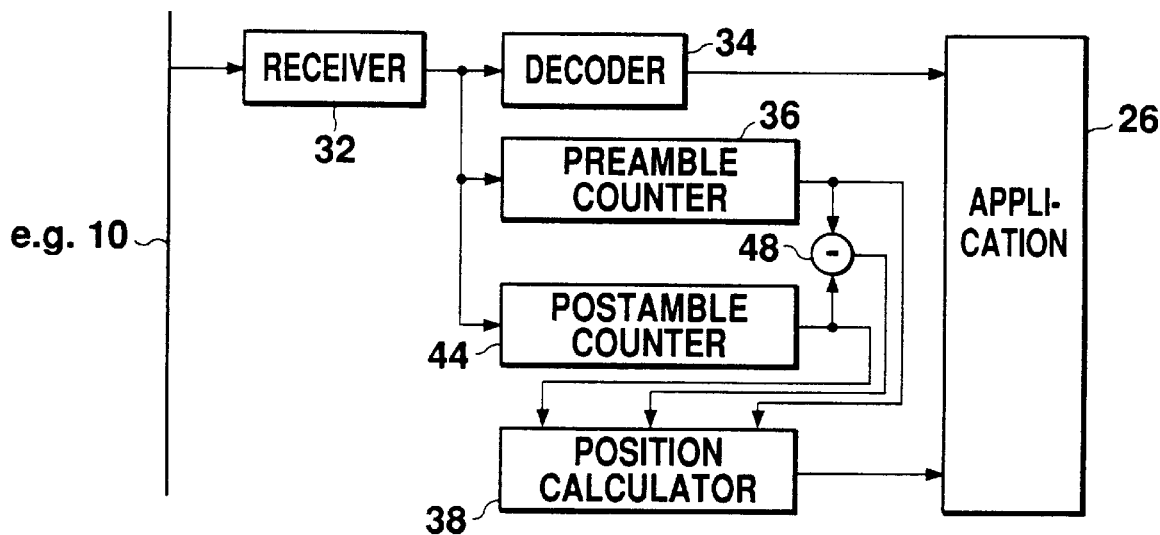

For instance, in FIG. 24 the position calculator 38 derives three possible results on the individual network to which the source equipment belongs, the results based on one value for PRE, the value of POST, and the total length of PRE and POST. In compliance with a variety of logical conclusions the position calculator 38 selects one of these 3 results by majority and sends it to the application 26 and, in a case where the 3 do not match, in addition to their content the position calculator 38 also notifies the application 26 of this fact. It is thus possible to detect the level of reliability of the detection of the individual network to which the source equipment belongs with even greater precision than FIG. 21. FIG. 25 differs from FIG. 24 in that it does not utilize the total length of PRE and POST but rather the difference between them.

Figure 26:
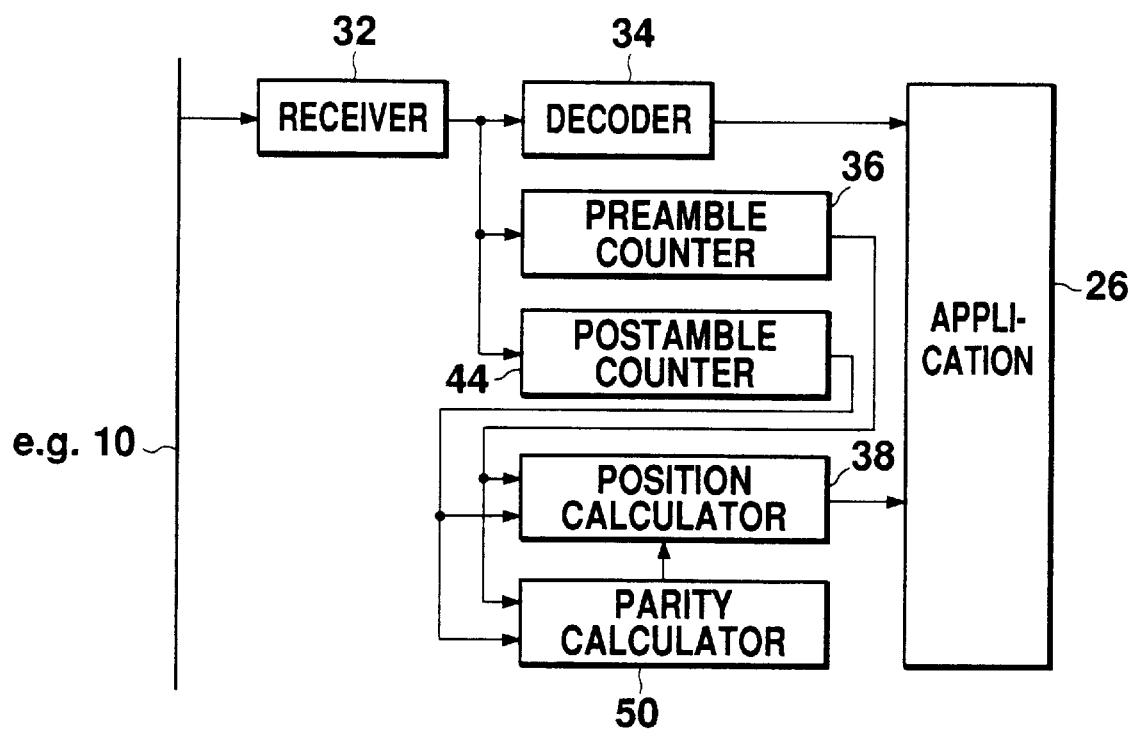

For instance, in FIG. 26 a parity calculator 50 judges whether or not parity is established between the output of the preamble counter 36 and the postamble counter 44 and supplies the result of that judgment to the position calculator 38. It is here assumed that PRE and POST increment/decrement is executed at every relay to ensure that parity is established between the length of PRE and the length of POST. Thus, by executing parity check at the destination equipment, loss of PRE and POST during transmission can be detected and reflected to the source position calculation.

c) Source-utilizing Embodiment

Another embodiment of the present invention is a source-utilizing embodiment in which each communications equipment (in particular the transmitter 16 or the controller 24) transmits a frame with PRE and/or POST length which is different from that of other communications equipment. In a source-utilizing embodiment, by detecting the length of PRE and/or POST at the destination equipment and carrying out processing based on this, source equipment can be individually specified. In other words, the advantage of a source-utilizing embodiment is that information can be obtained which specify not only the position of source equipment, but also specify the actual source equipment unit. Further, the present embodiment can easily be implemented even in the case where the respective communications equipments are portable or movable.

Figure 29:
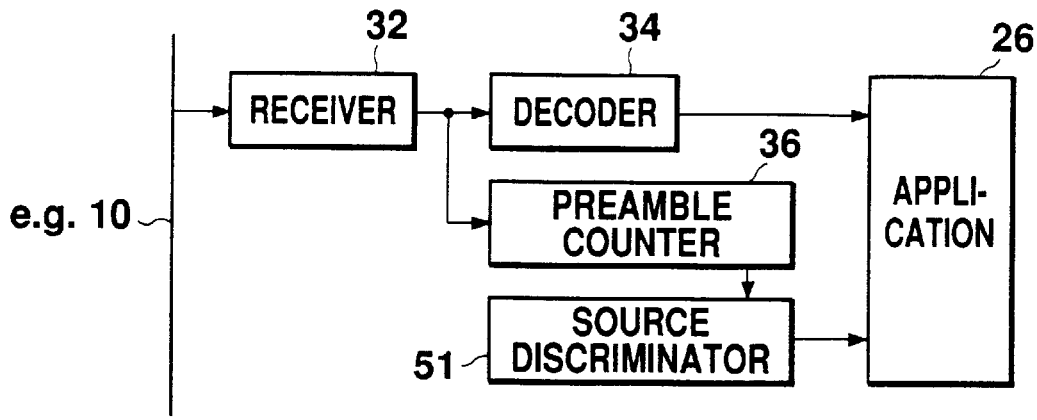
FIGS. 29, 30 and 31 are block diagrams showing example configurations of communications equipment suitable for implementing the present invention, in particular the portion pertaining to reception.
Figure 30:
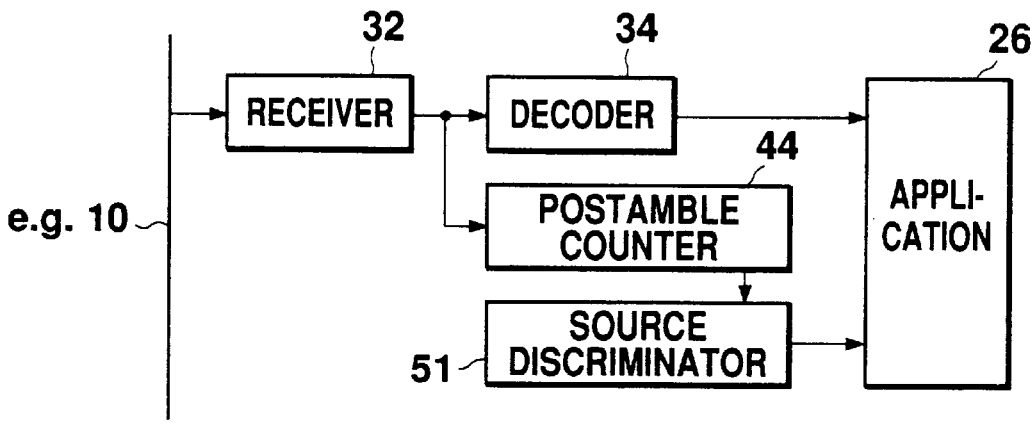
Figure 31:
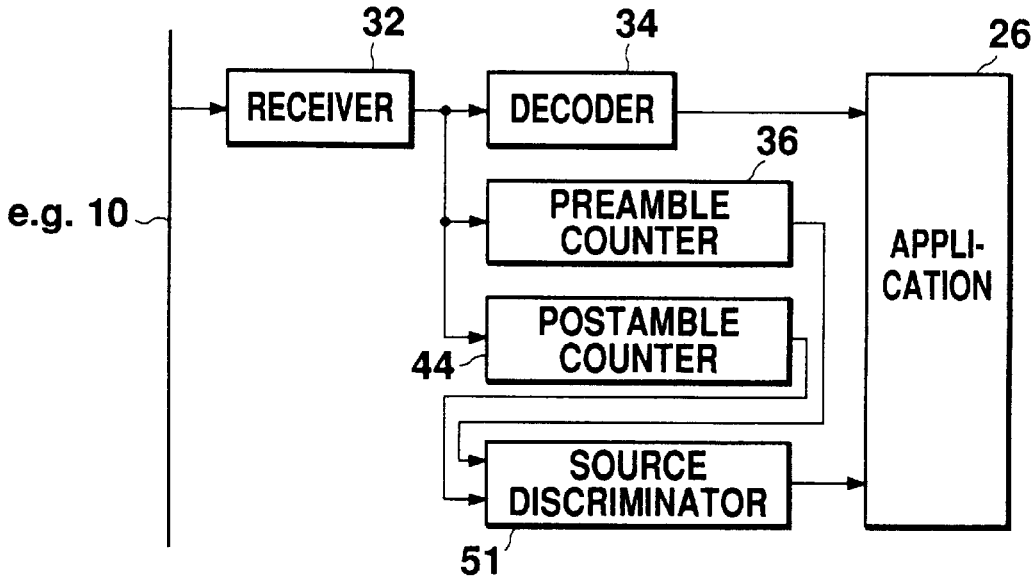

In a source-utilizing embodiment the portion of each communications equipment pertaining to transmission can have any of the configurations shown in FIGS. 8–10. Moreover, in a source-utilizing embodiment it is most preferable for the portion of each communications equipment pertaining to reception to have one of the configurations shown in FIGS. 29–31 which show configurations in which the position calculator 38 depicted in FIG. 18 and FIG. 21 has been replaced by a source discriminator 51 for specifying source equipment based on the length of PRE and/or POST. It should be readily apparent to a person skilled in the art that FIGS. 29–31 allow implementation of the same principles as FIGS. 22–26 in altered format.

d) Loss-utilizing Embodiment

Another embodiment of the present invention is a loss-utilizing embodiment. One advantage of this embodiment is that in relays it is not necessary to provide operation to the frame configuration, for instance to the lengths for PRE or POST. A loss-utilizing embodiment generally implies 3 embodiments: an embodiment utilizing partial PRE loss, an embodiment utilizing signal group delay distortion, and an embodiment utilizing signal attenuation.

d1) Partial PRE Loss

Figure 32:
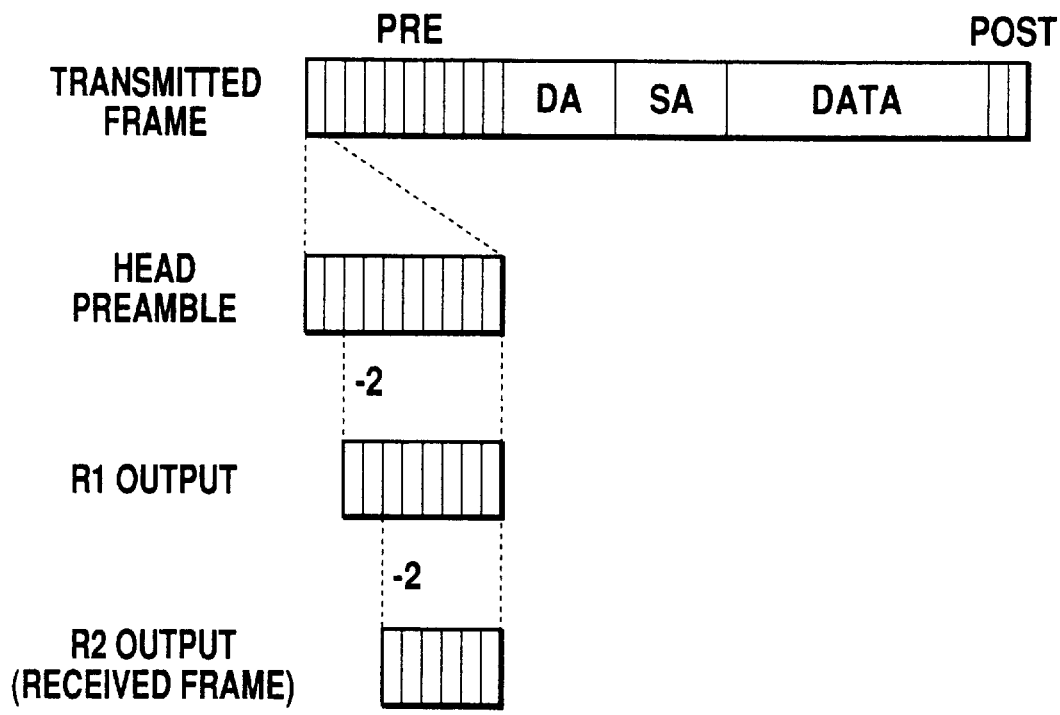
FIG. 32 is a conceptual diagram depicting an example of changes in a preamble duration accompanying frame transmission.
Figure 33:
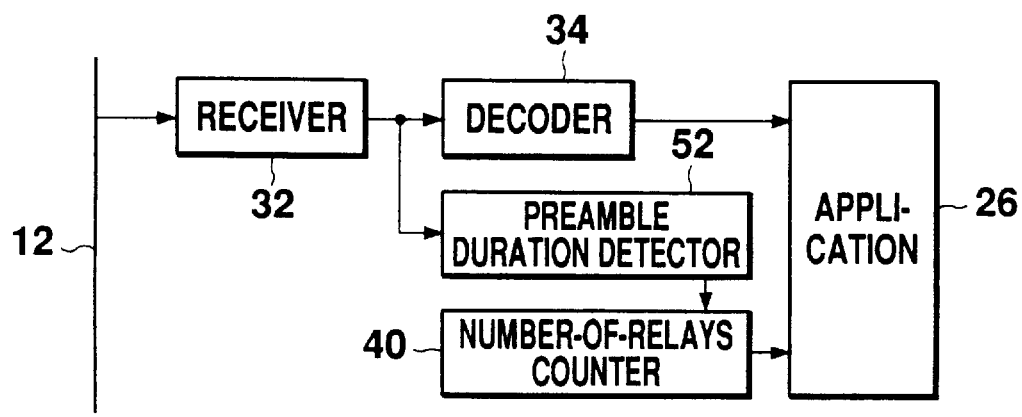
FIGS. 33, 34, and 35 are block diagrams depicting example configurations of communications equipment suitable for implementing the present invention, in particular the portion pertaining to reception.

In general, a certain amount of time is required between the arrival of a frame at a relay and the actual start of processing by the relay such as reception. This amount of time, in other words this delay, results in the loss of a number of bits at the head of the frame. "A number of bits at the head of a frame" here refers to the number of bits in the head of the PRE at the head of a plurality of PRE in one block. One loss-utilizing embodiment utilizes this phenomenon, namely partial PRE loss. For instance, let us suppose that it is known in advance that 2 bits are lost each time a frame passes through a relay. Now the duration of the head PRE is detected at the destination equipment, the difference from the previous duration i.e., the number of lost bits is detected, and this number is divided by 2 to give the number of relays through which a received frame has passed (See FIG. 32). FIG. 33 shows an example of communications equipment required for the implementation of this embodiment, in particular the portion pertaining to transmission. In this diagram, a preamble duration detector 52 is detecting the duration of a PRE at the head of a frame received by the receiver 32 and supplying the result to a number-of-relays counter 40. The number-of-relays counter 40 compares the detected PRE duration with the previous PRE duration and determines the number of intermediary relays from that result in compliance with the principles described above.

Figure 34:
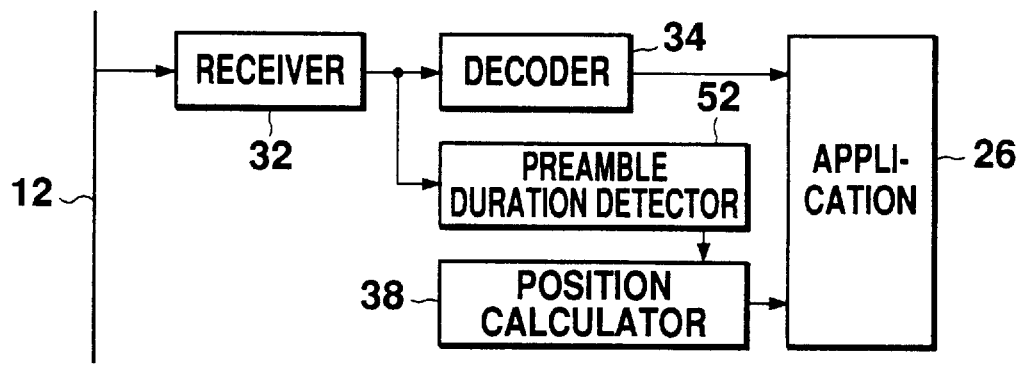

Many variations are possible of embodiments utilizing partial PRE loss. For instance, a position calculator 38 may be substituted for the number-of-relays counter 40 as shown in FIG. 34. The position calculator 38 determines the number of intermediary relays in compliance with the principles described above based on the duration of the head PRE and also possesses a function to specify the individual network to which the source equipment belongs based on this number of intermediary relays. In principal this type of function can be realized e.g., in a case in which each relay only executes relaying in one direction (i.e., the relay has a filtering property), or in a case in which it is used as communications equipment belonging to an individual network positioned at the tip portion of an integrated network having a topology wherein a plurality of individual networks are connected in a serpentine cascade.

d2) Group Delay Distortion

Figure 35:
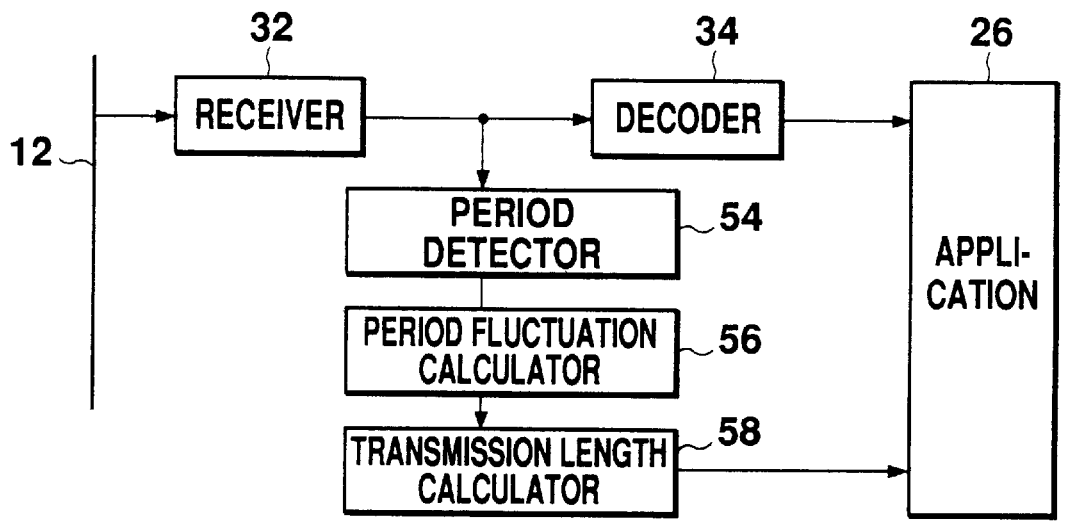
Figure 36:
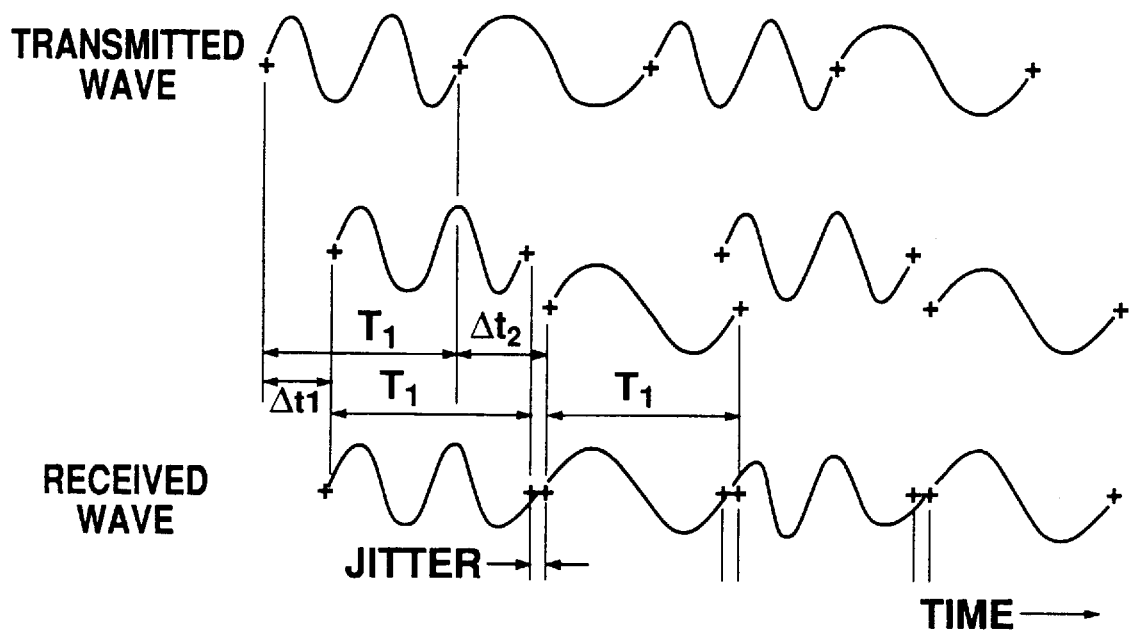
FIG. 36 is a timing chart conceptually showing the generation of a jitter caused by group delay.
Figure 37:
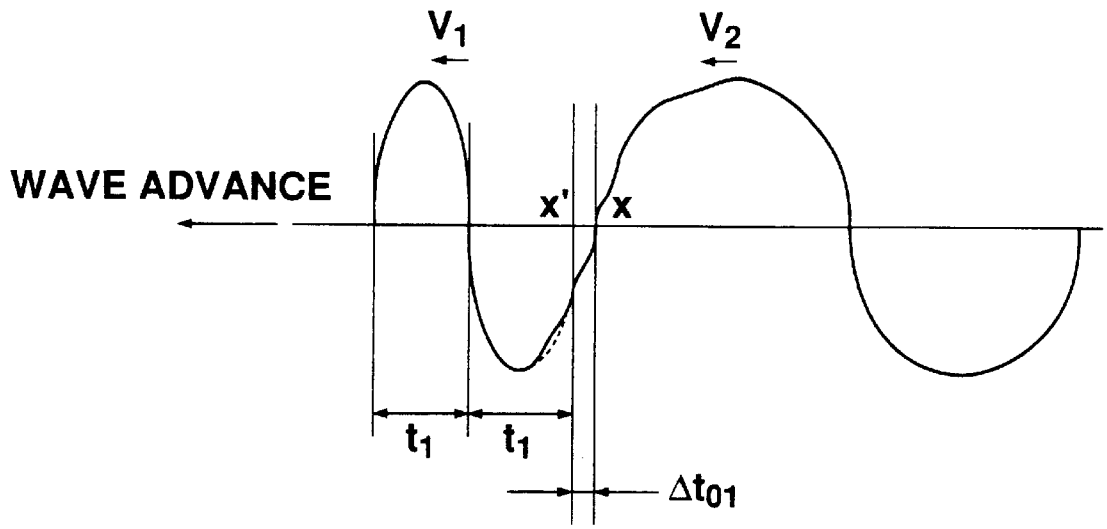
FIGS. 37 and 38 are timing charts showing the principle of source calculation utilizing group delay distortion.
Figure 38:
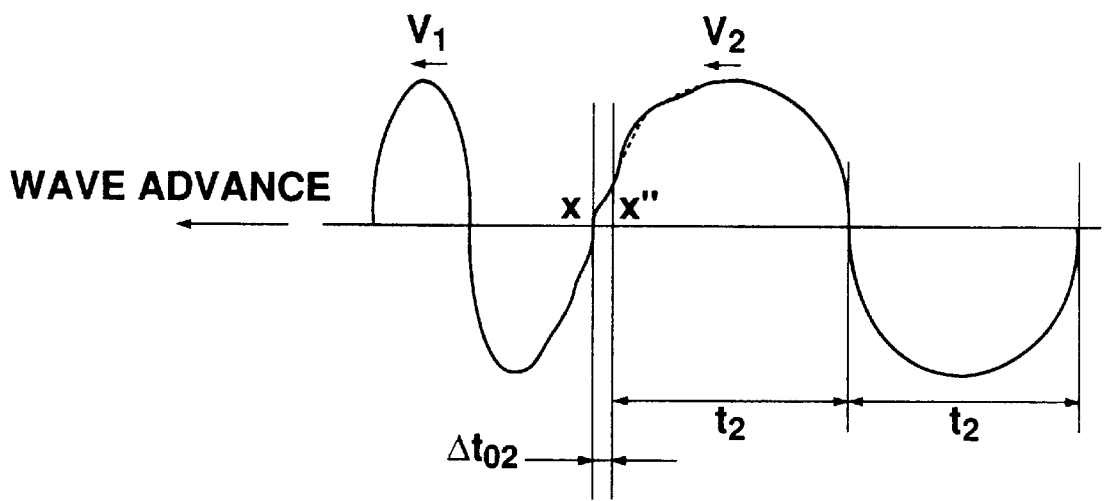

One loss-utilizing embodiment is an embodiment utilizing group delay distortion appearing in a received signal. FIG. 35 shows a configuration of communications equipment suitable for the implementation of this embodiment, in particular the portion pertaining to transmission; FIGS. 36–38 show a principle of source calculation of the present embodiment. To simplify the explanation, it is assumed that all communications equipment are using two-symbol FSK (frequency shift keying) modulation, in other words a modulation system for keying the signal frequency to f1 and f2 (f1>f2) at each code period.

In FIG. 35 a decoder 34 and a period detector 54 follow the receiver 32. The period detector 54, for instance, contains a zero-crossing detector for detecting the zero-cross of a signal received from the receiver 32, a timer for measuring the time between two zero-crosses detected sequentially, and an outputter for successively outputting the time measured namely a half period to a period fluctuation calculator 56. Of course this is just one example and the period detector 54 may also be configured to measure not half periods but, for instance, full periods.

The period fluctuation calculator 56 following the period detector 54 is for instance a first-order finite impulse response (FIR) filter having a half period or 1 period delay for delaying data obtained from the period detector 54 until the following data is obtained from the period detector 54, a subtractor for determining the difference between data obtained from the period detector 54 and data delayed by the delay, and weights for weighting the output of the delay and the subtractor. The period fluctuation calculator 56 derives the amount of variation in half period duration in each half period when the period detector 54 has measured a half period, and when a full period has been measured, the period fluctuation calculator 56 generally derives the amount of variation in full period duration in each full period.

The transmission length calculator 58 following the period fluctuation calculator 56 measures the physical transmission length from the source equipment of the transmission line through which a signal has passed by comparing the amount of half period or full period variation which has been measured with a desired half or full period and supplies the measurement result to the application 26.

An example signal waveform of a modulated wave transmitted by source equipment is shown at the top of FIG. 36. The symbol "+" shows those zero-cross points relevant to the start and end of the code period, and at the transmission point the end of the preceding code period matches the start of the next code period. Moreover, the period duration of each code period is a fixed value T1.

The signal frequency here at one code period is keyed to f1 and at the next code period is keyed to f2. If the group delay $\Delta t1$ at a signal frequency f1 and the group delay $\Delta t2$ at a signal frequency f2 were to be equal, the signal waveform at reception would be the same as the signal waveform at transmission (i.e., ideal undistorted transmission). However, in reality group delay in a signal transmission line usually has frequency characteristics; in other words, as shown in the middle stage of FIG. 36, in general $\Delta t1$ does not equal to $\Delta t2$. These frequency vs. group delay characteristics lead to the jitter (a kind of group delay distortion) at the code-to-code transition point represented by "+" symbol in a received signal, as shown in the lower stage of FIG. 36.

This jitter, namely the zero-cross deviation can be detected by examining the zero-cross of the reception signal. For instance, let us consider a zero-cross point X at which a signal frequency is switched from f2 to f1 (see FIGS. 37 and 38). There are 2 possible desired values for this zero-cross point X; one is point X' determined from frequency f1 (FIG. 37) and the other is point X" determined from frequency f2 (FIG. 38). In other words, when the value is determined from frequency f1 it can be said that the zero-cross point has deviated from X' to X and when the value is determined from frequency f2 it can be said that the zero-cross point has deviated from X" to X. Therefore by detecting this zero-cross deviation $\Delta t01$ (=[X'-X]) and $\Delta t02$ (=[X"-X]) by the period calculator 54 and the period fluctuation calculator 56, and by calculating $(v1-v2)*(\Delta t1+\Delta t2)$ by the transmission length calculator 28 using the transmission velocity v1 at frequency f1 and transmission velocity v2 at frequency f2, it is able to detect the distance to the source equipment. Ideal zero-cross points X' and X" are provided from a measurement of the zero-cross period within 1 code period or from data with a designated design.

The present embodiment can be implemented provided that a transmission line having group delay with frequency characteristics and a modulation system in which frequency is switched at each symbol are used. For instance, the present invention could be implemented using a modulation system such as QAM (quadrature amplitude modulation).

d3) Attenuation

Figure 39:
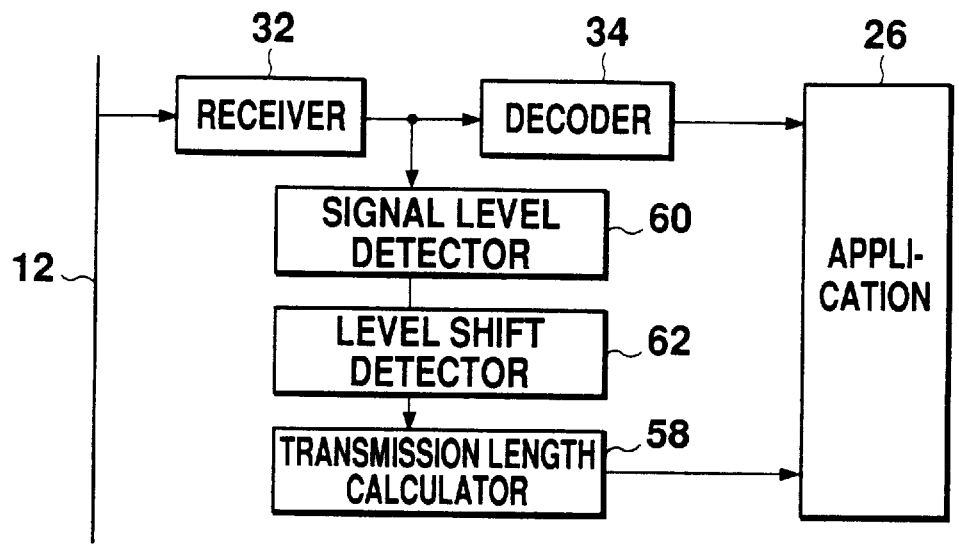
FIG. 39 is a block diagram depicting an example configuration of communications equipment suitable for implementing the present invention, in particular the portion thereof pertaining to reception.
Figures 40, 41:
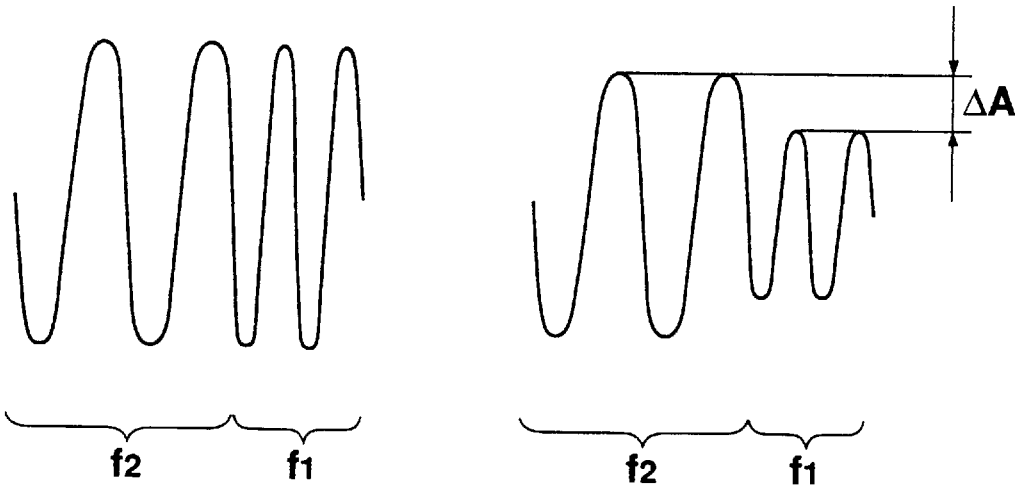
FIGS. 40 and 41 are flow charts to explain differences in transmission loss vs. frequency.

One loss-utilizing embodiment is an embodiment utilizing signal attenuation appearing in a received signal. FIG. 39 shows a configuration of communications equipment suitable for the implementation of this embodiment, in particular the portion pertaining to reception; FIGS. 40 and 41 show a principle of source position calculating of this embodiment. In the present embodiment it is also assumed for explanation purposes that there are two FSK having two symbols of f1 and f2 as in the embodiment shown in FIG. 35. The present embodiment can be implemented provided that a transmission line having an attenuation with frequency characteristics and a modulation system in which frequency is switched at each symbol are used.

In FIG. 39 a signal level detector 60 is provided together with a decoder 34 following a receiver 32. The signal level detector 60 measures the level of a signal received by the receiver 32 and a signal level shift detector 62 detects the stepwise variation $\Delta A$ in received signal level at the zero-cross point. In detail, although the frequency f1 signal and frequency f2 signal both have the same amplitude when they leave the source equipment (see FIG. 40), the amplitudes of the frequency f1 signal and frequency f2 signal differ at reception, since transmission lines generally have attenuation characteristics dependent on frequency (see FIG. 41). Generally signal level attenuation accompanying transmission is larger for higher frequencies. A transmission length calculator 58 calculates the distance to the source equipment (i.e., length of transmission line) based on already known attenuation characteristics of a transmission line and the detected variation ΔA.

Generally, embodiments utilizing group delay distortion are applicable for high frequency transmissions which are likely to suffer from group delay distortion and embodiments utilizing attenuation are applicable for long distance transmissions which are likely to suffer from attenuation.

e) Joint-utilization Embodiments

The abovementioned relay-utilizing, source-utilizing and loss-utilizing embodiments can in principle be combined with no loss in their advantages and, in some cases, with additional advantages.

The following embodiment is one of the relay/source joint utilization embodiments wherein a relay-utilizing embodiment and a source-utilizing embodiment have been combined. First, as in the simple source-utilizing embodiment, each communications equipment (e.g., A1 in FIG. 1) transmits a frame with PRE and/or POST whose length differs from the PRE and/or POST length from other communications equipment. However, in the present joint-utilization embodiment, "other communications equipment" is limited here to communications equipment belonging to the same individual network (e.g., A2 and A3), and therefore it is permitted that with communications equipment belonging to different individual networks (e.g., between A1 and B1) the lengths of PRE and/or POST appended at transmission time may be the same. In addition, the length of PRE and/or POST is incremented/decremented at each relay (e.g., R1–R3), as in the simple relay-embodiment. One advantage of this joint-utilizing embodiment is that it is applicable for a large-scale integrated network and the allocation of PRE/POST lengths at each communications equipment is comparably easier than with a simple source-utilizing embodiment; in other words, in a simple source-utilizing embodiment the length of PRE/POST at transmission time must be allocated to all communications equipment so that each communications equipment which constitute the integrated network can be discriminated, but since in a joint-utilization embodiment it is only necessary to discriminate by the initial length of PRE and/or POST between communications equipment belonging to the same individual network, the allocation of PRE/POST lengths at transmission time is simplified.

Figure 42:
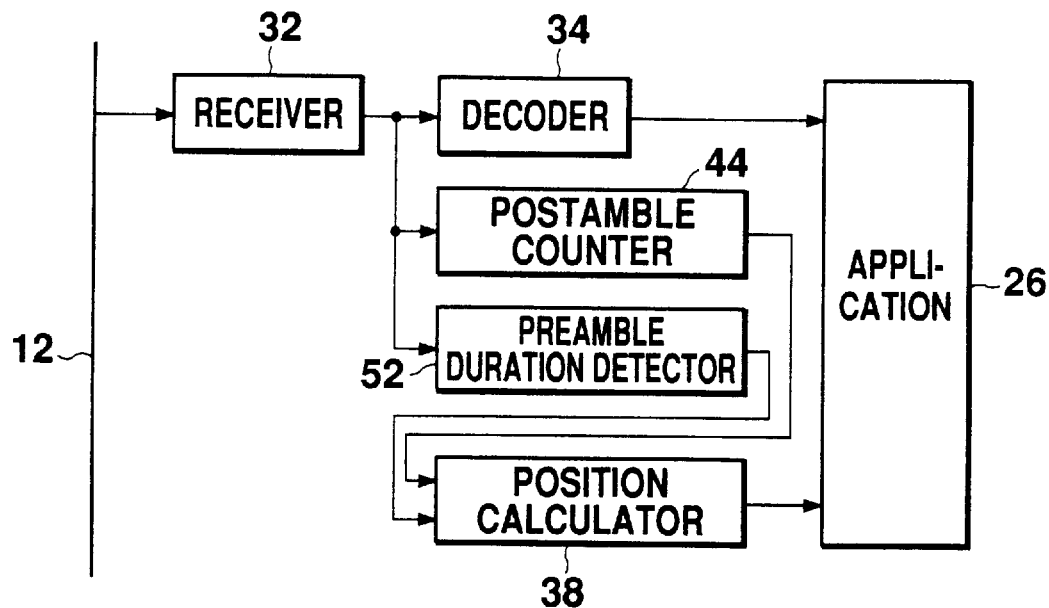
FIGS. 42 and 43 are block diagrams showing example configurations of communications equipment suitable for implementing the present invention, in particular the portion thereof pertaining to reception.
Figure 43:
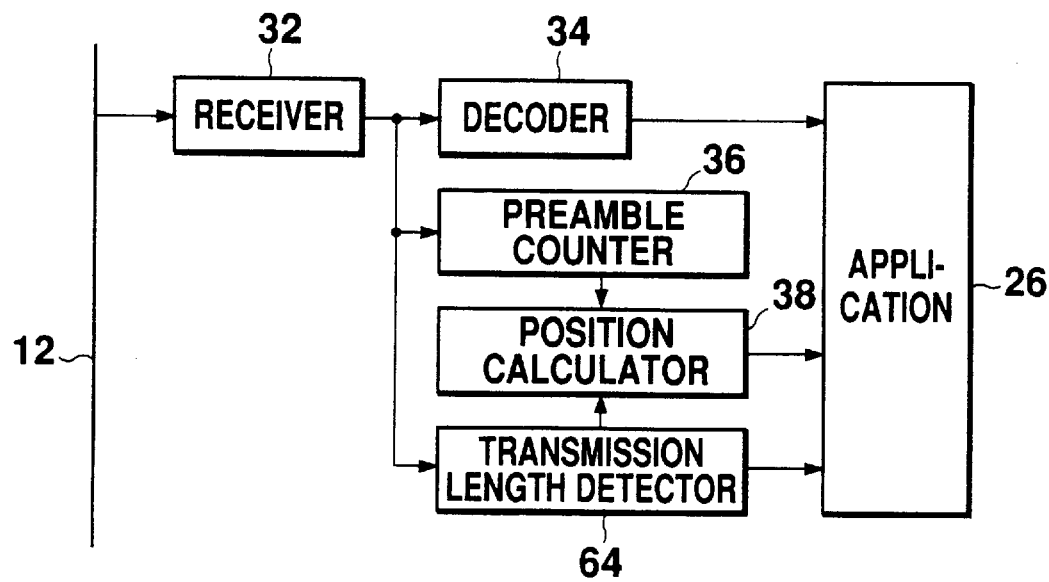

A relay/loss-joint-utilization embodiment wherein a relay-utilizing embodiment and a loss-utilizing embodiment have been combined and a source/loss-joint-utilization embodiment wherein a source-utilizing embodiment and a loss-utilizing embodiment have been combined are both realized by combining a PRE and/or POST length detection means and a signal loss evaluation means. For instance, a postamble counter 44 and a preamble duration detector 52 are combined as shown in FIG. 42. Alternatively, a preamble counter 36 and a transmission length detector 64 are combined as shown in FIG. 43. The transmission length detector 64 may preferably contain a period detector 54, a period fluctuation calculator 56 and a transmission length calculator 58 or alternatively contain a signal level detector 60, a level shift detector 62, and a transmission length calculator 58. The position calculator 38 determines the position of source equipment more precisely than simple relay-utilizing, simple source-utilizing, or simple loss-utilizing embodiments by appropriate combination of the count value obtained by the postamble counter 44 and the PRE duration detected by the preamble duration detector 52, or alternatively, of the count value obtained by the preamble counter 36 and the transmission length detected by the transmission length detector 64, the precise detection being a result of combining data obtained from differing principles. At the same time, this has the advantage of high reliability since, when one of the functions has malfunctioned, the other function can be used to continue to execute the detection of the source position. Moreover, based on the above descriptions of each of the embodiments, FIG. 42 and FIG. 43 can be varied even further. It should be obvious to a person skilled in the art who has consulted the disclosures of this application that FIG. 42 and FIG. 43 are also applicable to a relay/source/loss joint-utilization embodiment wherein relay-utilizing, source-utilizing and loss-utilizing embodiments are combined.

While there have been described what are at present considered to be preferred embodiments of the invention, it will be understood that various modifications may be made to the present invention and it is intended that the appended claims cover all such modifications as fall within the true spirit and scope of the invention.

What is claimed is:

1. A source position detecting method implemented when a coded data signal is transmitted between a plurality of communications equipment connected via a relay, the source position detecting method having the following steps of:

transmitting from a source equipment, which is one of said plurality of communication equipment, the coded data signal with a designated number of redundant signals;

relaying by the relay the coded data signal with an increased or decreased number of the redundant signals, without decoding the coded data signal; and detecting by a destination equipment, which is another one of said plurality of communications equipment, the position of the source equipment based on a number of redundant signals received with the coded data signal.

2. A source position detecting method according to claim 1, wherein 3 or more individual networks each having communications equipment are cascade-connected in a serpentine form through a plurality of relays, absolute values of amounts of increment or decrement to numbers of the redundant signals by respective relays are equal, and signs of said amounts are different for each transmission direction of the coded data signal.

3. A source position detecting method according to claim 1, wherein 3 or more individual networks each having communications equipment are connected through a plurality of relays, and amounts of increment or decrement to numbers of the redundant signals by respective relays are mutually different.

4. A source position detecting method according to claim 3, wherein signs of said amounts are different for each transmission direction of the coded data signal.

5. A source position detecting method according to claim 1, wherein at least one of a set of preambles and a set of postambles is used as redundant signals, the preambles preceding the coded data signal and the postambles following the coded data signal.

6. A source position detecting method according to claim 5, wherein both the preambles and the postambles are used as the redundant signals; and the destination equipment detects the length of preambles which precede the coded data signal which has been received, detects the length of postambles which follow the coded data signal which has been received, and detects the position of the source equipment by synthesizing detected length of the preambles and detected length of the postambles.

7. A source position detecting method according to claim 6, wherein the destination equipment detects the position of the source equipment based on a sum of the detected length of the preambles and the detected length of the postambles.

8. A source position detecting method according to claim 6, wherein the destination equipment checks parity of the detected length of the preambles and the detected length of the postambles.

9. A source position detecting method according to claim 1, further having steps of:

detecting by the destination equipment from the coded data signal or the redundant signals appended thereto received via a signal transmission line extent of signal loss imparted at the signal transmission line or at equipment related; and detecting by the destination equipment the position of the source equipment based on the extent of signal loss.

10. A source position detecting method implemented when a coded data signal is transmitted between a plurality of communications equipment mutually connected, the source position detecting method comprising:

transmitting from a source equipment, which is one of the plurality of communications equipment, the coded data signal with redundant signals, a number of the redundant signals enabling distinguishing of said plurality of communications equipments from each other; and detecting by a destination equipment, which is another one of said plurality of communications equipment, a position of the source equipment based on the number of the redundant signals received with the coded data signal without decoding the coded data signal.

11. A source position detecting method according to claim 10, wherein at least one of a set of preambles or a set of postambles is used as the redundant signals, the preambles preceding the coded data signal and the postambles following the coded data signal.

12. A source position detecting method according to claim 11, wherein both the preambles and the postambles are used as the redundant signals; and the destination equipment detects the length of the preambles which precede the coded data signal which has been received, detects a length of the postambles which follow the coded data signal which has been received, and detects the position of the source equipment by synthesizing detected length of preambles and detected length of postambles.

13. A source position detecting method according to claim 12, wherein the destination equipment detects the position of the source equipment based on a sum of the detected length of the preambles and the detected length of the postambles.

14. A source position detecting method according to claim 12, wherein the destination equipment checks parity of the detected length of the preambles and the detected length of the postambles.

15. A source position detecting method according to claim 10, wherein the destination equipment detects from the coded data signal or the redundant signals appended thereto received via a signal transmission line extent of signal loss imparted at the signal transmission line or at equipment related thereto; and the destination equipment detects the position of the source equipment based on the extent of signal loss.

16. A source position detecting method implemented when a coded data signal is transmitted between a plurality of communications equipment mutually connected, said source position detecting method comprising:

detecting by a destination equipment, which is one of the plurality of communications equipment, extent of signal loss imparted at a signal transmission line or at equipment related to the signal transmission line from at least one of the coded data signal and a redundant signal appended thereto, both the coded data signal and the redundant signal being received via the signal transmission line; and detecting by the destination equipment a position of a source equipment, which is another one of the plurality of communications equipment and has transmitted the coded data signal, based on the extent of signal loss, wherein the destination equipment detects the extent of signal loss based on duration of a preamble which is the redundant signal and precedes the coded data signal received via the signal transmission line.

17. A source position detecting method implemented when a coded data signal is transmitted between a plurality of communications equipment mutually connected, said source position detecting method comprising:

detecting by a destination equipment, which is one of the plurality of communications equipment, extent of signal loss imparted at a signal transmission line or at equipment related to the signal transmission line from at least one of the coded data signal and a redundant signal appended thereto, both the coded data signal and the redundant signal being received via the signal transmission line; and detecting by the destination equipment a position of a source equipment, which is another one of the plurality of communications equipment and has transmitted the coded data signal, based on the extent of signal loss, wherein the destination equipment detects the extent of signal loss based on signal distortion included in the coded data signal or in the redundant signal either of which being received via the signal transmission line, said signal distortion being group delay created as a result of differences in the transmission velocities of a plurality of frequency components constituting the coded data signal or the redundant signal is detected as the signal distortion; and length of the signal transmission line is determined based on the group delay and given transmission velocities, the position of the source equipment being detected according to length.

18. A source position detecting method implemented when transmitting a coded data signal via a relay between communications equipment belonging to different individual networks, the source position detecting method comprising the steps of:

transmitting by a source equipment, which is one of the communication equipments, the coded data signal with redundant signals, the number of redundant signals enables identification of the communications equipment belonging to a same individual network;

relaying by the relay the coded data signal received from one individual network to another with an increased or decreased number of redundant signals; and detecting by a destination equipment, which is another one of the communication equipment, a position of the source equipment based on a number of the redundant signals received with the coded data signal.

19. A source position detecting method according to claim 18, further having steps of:

detecting by the destination equipment detects from the coded data signal or the redundant signals appended thereto received via a signal transmission line extent of signal loss imparted at the signal transmission line or at equipment related thereto; and detecting by the destination equipment the position of the source equipment based on the extent of signal loss.

20. A communications system comprising:

a source equipment for transmitting a coded data signal with a designated number of redundant signals;

a relay for relaying the coded data signal with an increased or decreased number of redundant signals, without decoding the coded data signal; and a destination equipment for detecting a position of the source equipment based on the number of redundant signals received with the coded data signal.

21. A communications system comprising:

a source equipment for transmitting a coded data signal with a number of redundant signals, the number of redundant signals being so set that the number is identifiable by other communications equipment; and a destination equipment for detecting a position of the source equipment based on the number of redundant signals received with the coded data signal without decoding the coded data signal.

22. A communications system provided by integrating a plurality of individual networks each of which generally has a plurality of communications equipment, the communications system comprising:

a source equipment, which is one of the plurality of communications equipments, for transmitting a coded data signal with a number of redundant signals, the number being so set that it is capable of identification with other communications equipment belonging to the same individual network as the source equipment;

a relay for relaying the coded data signal with an increased or decreased number of redundant signals from one of the plurality of the individual networks to another; and a destination equipment for detecting a position of the source equipment based on the number of redundant signals.

23. A communications equipment comprising:

a means for detecting a number of redundant signals appended to a received coded data signal;

a means for detecting a position of a source equipment which has transmitted the received coded data signal based on the number of redundant signals without decoding the coded data signal.

24. A communications equipment comprising:

a means for receiving a coded data signal and a redundant signal appended thereto;

a means for detecting extent of signal loss imparted at a signal transmission line or at equipment related thereto based on a received coded data signal or the redundant signal received via the signal transmission line without decoding the coded data signal; and a means for detecting a position of a source equipment based on the extent of signal loss, said source equipment having transmitted the received coded data signal;

wherein the means for detecting the position of the source equipment detects the extent of signal loss based on duration of a preamble which is the redundant signal and precedes the coded data signal received via the signal transmission line.

25. A relay comprising:

a means for receiving a coded data signal and redundant signals;

a means for transmitting the coded data signal as is with the redundant signals; and a means for at least one of increasing or decreasing the number of redundant signals after reception and before transmission, wherein the means for at least one of increasing or decreasing the number of redundant signals increases or decreases the number of redundant signals by an amount different than another relay used in a communication system.

26. A communications equipment comprising:

a means for receiving a coded data signal;

a means for detecting extent of signal loss imparted at a signal transmission line or at equipment related thereto from a received coded data signal or a redundant signal appended thereto received via the signal transmission line; and a means for detecting a position of a source equipment based on the extent of signal loss, said source equipment having transmitted the received coded data signal;

wherein the means for detecting the position of the source equipment detects the extent of signal loss based on signal distortion included in the coded data signal or in the redundant signal, said signal distortion being group delay created as a result of differences in the transmission velocities of a plurality of frequency components constituting the coded data signal or the redundant signal is detected as the signal distortion, and wherein length of the signal transmission line is determined based on the group delay and given transmission velocities, the position of the source equipment being detected according to the length of the signal transmission line.

* * * * *